US010620337B2

(12) United States Patent
Lindmark et al.

(10) Patent No.: US 10,620,337 B2
(45) Date of Patent: Apr. 14, 2020

(54) RETRO-REFLECTIVE SENSOR WITH MULTIPLE DETECTORS

(71) Applicant: Banner Engineering Corp., Plymouth, MN (US)

(72) Inventors: Eric Lindmark, Shoreview, MN (US); Paul D. Bratton, Plymouth, MN (US); Dennis John Smith, Minneapolis, MN (US); Neal A. Schumacher, Plymouth, MN (US)

(73) Assignee: Banner Engineering Corp., Plymouth, MN (US)

( * ) Notice: Subject to any disclaimer, the term of this patent is extended or adjusted under 35 U.S.C. 154(b) by 0 days.

(21) Appl. No.: 16/381,804

(22) Filed: Apr. 11, 2019

(65) Prior Publication Data

US 2019/0331829 A1    Oct. 31, 2019

Related U.S. Application Data

(63) Continuation of application No. 15/472,068, filed on Mar. 28, 2017, now Pat. No. 10,393,918.

(51) Int. Cl.
    *G01V 8/22*      (2006.01)
(52) U.S. Cl.
    CPC ..................... *G01V 8/22* (2013.01)
(58) Field of Classification Search
    CPC ....................................................... G01V 8/22
    See application file for complete search history.

(56) References Cited

U.S. PATENT DOCUMENTS

| 4,224,608 | A  | * | 9/1980 | Lederer | G01V 8/14 250/221 |
| 5,004,908 | A  | * | 4/1991 | Nakamura | G01V 8/12 250/221 |
| 5,008,530 | A  | * | 4/1991 | Ball | F16P 3/144 250/221 |
| 2003/0047672 | A1 | * | 3/2003 | Henkel | F16P 3/144 250/221 |
| 2010/0157278 | A1 | * | 6/2010 | Horsch | G01S 7/4802 356/3.01 |
| 2011/0116105 | A1 | * | 5/2011 | Zhu | G01B 11/002 356/621 |
| 2014/0217266 | A1 | * | 8/2014 | Quaiser | G01V 8/22 250/208.4 |

* cited by examiner

*Primary Examiner* — Thanh Luu
(74) *Attorney, Agent, or Firm* — Craige Thompson; Thompson Patent Law

(57) ABSTRACT

Apparatus and associated methods relate to a photoelectric sensor system with a primary photo-detector to receive an on-axis return reflected by a retro-reflective target, and a monitor photo-detector to detect off-axis light indicative of a diffuse reflective object blocking the optical path between an emitter and the retro-reflective target. In an illustrative example, the optical path may include a coaxial transceiver module that includes a beam splitter mirror to redirect the optical path. In some embodiments, a bifurcated lens may provide, for example, a lateral offset of the emitter axis through one lens, and the return axis through an adjacent parallel lens. The second photo-detector may provide, for example, an array of one or more detection surfaces to detect off-axis light associated with a diffuse reflective object, such as a white card, for example.

20 Claims, 17 Drawing Sheets

RETRO-REFLECTIVE SENSOR WITH MULTIPLE DETECTORS

TECHNICAL FIELD

Various embodiments relate generally to photo sensing systems.

BACKGROUND

Photoelectric sensors may be employed to detect objects within a field of view. In some examples, a photoelectric sensor system may be used to discover the absence or presence of an obstruction by employing a light emitting diode (LED) and a photo-detector. Photoelectric sensors are widely used in applications that may include, but are not limited to, manufacturing and consumer applications. Several different types of photoelectric sensor systems may be used, for example, in industrial or commercial settings. One type is retro-reflective.

In a retro-reflective sensor system, an emitter sends a transmitted beam of light across a protected area. The beam, when not obstructed, is designed to hit, and reflect off from, a retro-reflector. The reflected beam then makes its way back to the sensor, where a photo-detector is struck by the reflected beam.

The effective range of a retro-reflective system is limited in part by reflections of the emitted light beams from an object that obstructs the field of view between the emitter and the retro-reflector such as other reflective materials which can also reflect sufficient light beams capable of striking the photoelectric sensor and incorrectly determine that no obstruction is present, when in fact an obstruction is present. For example, white labels on boxes or reflective clothing worn by individuals crossing through the field of view can create a false sensing event. In an illustrative example, retro-reflective systems may be calibrated by introducing a "white card" test sample into the beam, as an obstruction at close proximity to the emitter. If the photoelectric sensor is struck by sufficient scattered light beams to incorrectly determine no obstruction is present, the minimum sensor threshold of the emitter must be increased. Doing so will not only reduce the chance of incorrectly determining no object is present but will also decrease the total detection effective range with which the retro-reflector may be positioned from the emitter to obtain a reliable signal intensity to strike the photoelectric sensor, under normal operating conditions.

SUMMARY

Apparatus and associated methods relate to a photoelectric sensor system with a primary photo-detector to receive an on-axis return reflected by a retro-reflective target, and a monitor photo-detector to detect off-axis light indicative of a diffuse reflective object blocking the optical path between a sensor and the retro-reflective target. In an illustrative example, the optical path may include a coaxial transceiver module that includes a beam splitter to redirect the optical path. In some embodiments, a bifurcated lens may provide, for example, a lateral offset of the emitter axis through one lens, and the return axis through an adjacent parallel lens. The monitor photo-detector may provide, for example, an array of one or more detection surfaces to detect off-axis light associated with a diffuse reflective object, such as a white card, for example.

Various embodiments may achieve one or more advantages. For example, in some embodiments, the monitor photo-detector element(s) may independently aid in the determination of the obstructions in the light path by detecting off-axis reflections from diffuse obstructions, such as white cards. In some examples, this independent detection may allow a lower minimum sensor threshold value. The lower minimum threshold value, in some embodiments, may advantageously increase the total detection effective range of the retro-reflective system providing installers an easier to align retro-reflective photoelectric sensor (RRPES).

In some examples, independent identification of the false sensing event may advantageously allow detection of a true clear or blocked path to the retro-reflective target, even in the presence of highly reflective diffuse objects in the sensing beam, for example. In some examples, both the first and the monitor photo-detectors may be formed on the same substrate to conserve space and assembly cost.

The details of various embodiments are set forth in the accompanying drawings and the description below. Other features and advantages will be apparent from the description and drawings, and from the claims.

BRIEF DESCRIPTION OF THE DRAWINGS

Like reference symbols in the various drawings indicate like elements.

DETAILED DESCRIPTION OF ILLUSTRATIVE EMBODIMENTS

To aid understanding, this document is organized as follows. First, exemplary use cases, detailing advantages of the added monitor photo-detector, are briefly introduced with reference to FIGS. 1A-1D and 2A-2E. Second, with reference to FIGS. 3A-3B and FIG. 4, the discussion turns to exemplary embodiments that illustrate one-lens (coaxial) and two-lens (bifurcated) configurations, specifically, the returned off-axis light beam landing substantially offset from the main retro-reflector beam. In FIGS. 5A-5D, a discussion of experimental photoelectric sensor data is presented to explain improvements in detection of beam reflections. Hardware and software diagrams are briefly introduced with reference to FIGS. 6, and 7A-7B. Finally, with reference to FIGS. 8A-8F, several exemplary embodiments illustrating various arrangements of photo-detectors are discussed.

Figure 1A:
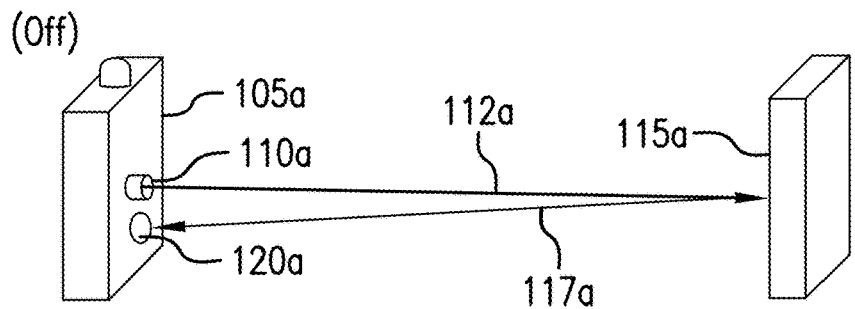
FIGS. 1A, 1B, 1C and 1D depict perspective views of exemplary use cases of a retro-reflective photoelectric sensor (RRPES), detailing the advantage of added monitor photo-detector(s) on white obstructions.

FIGS. 1A, 1B, 1C and 1D depict perspective views of exemplary use cases of a retro-reflective photoelectric sensor (RRPES), detailing the advantage of an added monitor photo-detector on white obstructions. An RRPES 105a includes a photoelectric emitter 110a. The photoelectric emitter 110a emits a transmitted beam of light 112a to a retro-reflector 115a. The retro-reflector 115a reflects a reflected beam of light 117a back toward the RRPES 105a where it strikes a photo-detector 120a. In some examples, an unobstructed reflected beam, as shown in FIG. 1A, indicates an unblocked or unobstructed output state from the RRPES 105a. In some embodiments, the RRPES system design may balance increased beam-sensing sensitivity, which may advantageously provide increased sensing range, with improved immunity against detection failure, for example, under the diffused reflected light conditions from a white card.

Figure 1B:
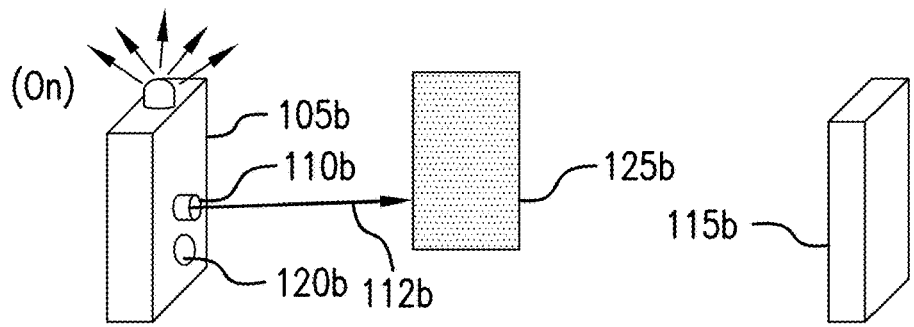

An RRPES 105b includes a photoelectric emitter 110b. The photoelectric emitter 110b emits a transmitted beam of light 112b to an absorptive obstruction 125b. The absorptive obstruction 125b prevents the RRPES 105b transmitted beam of light 112b from reaching a retro-reflector 115b. Additionally, due to the limited reflectance of the absorptive obstruction 125b, the transmitted beam of light 112b is blocked from reflecting back to a photo-detector 120b. In some embodiments, the obstructed beam (transmitted beam of light 112b), as shown in FIG. 1B, may indicate a blocked or obstructed output state from the RRPES 105b.

Figure 1C:
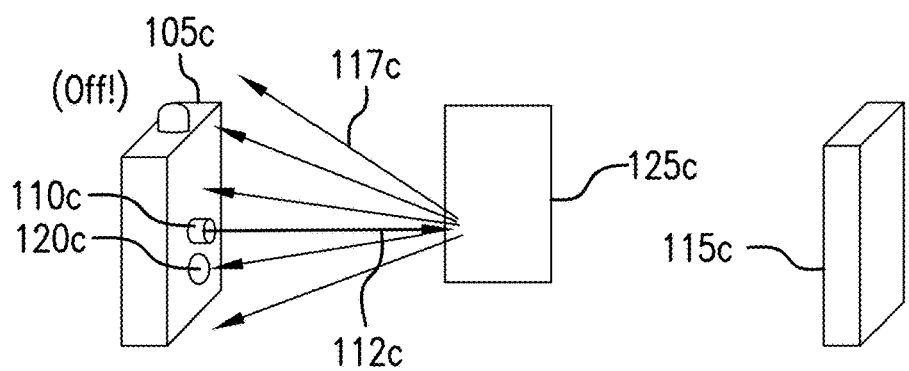

An RRPES 105c provides a photoelectric emitter 110c. The photoelectric emitter 110c emits a transmitted beam of light 112c toward a white, reflective obstruction 125c. The white, reflective obstruction 125c prevents the RRPES 105c transmitted beam of light 112c from reaching a retro-reflector 115c. The reflected light 117c scattered after reflecting off the surface of the white, reflective obstruction 125c, returning to a photo-detector 120c. In some embodiments, the reflected light 117c, as shown in FIG. 1C, may incorrectly indicate an unblocked or unobstructed output state from the RRPES 105c, due to the scattered light detected at the photo-detector 120c.

Figure 1D:
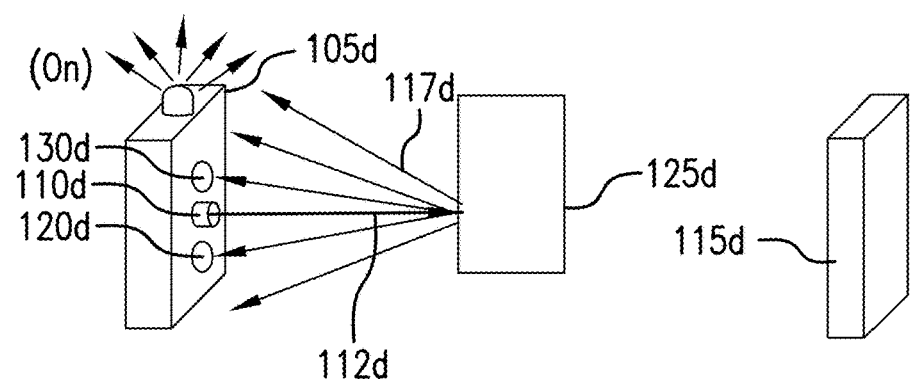

An RRPES 105d includes a photoelectric emitter 110d. The photoelectric emitter 110d emits a transmitted beam of light 112d to a white, reflective obstruction 125d. The white, reflective obstruction 125d prevents the RRPES 105d transmitted beam of light 112d from reaching a retro-reflector 115d. The reflected light 117d scatters after reflecting off the surface of the white, reflective obstruction 125d, returning to a photo-detector 120d and to a second photo-detector 130d. In some embodiments, with the pair of photo-detectors 120d and 130d, the reflected light 117d, as shown in FIG. 1D, may now correctly indicate a blocked or obstructed output state from the RRPES 105d. In some embodiments, with the pair of photo-detectors 120d and 130d, the detection threshold may be lowered, which may advantageously allow acceptable system detection performance at longer ranges between the RRPES and the retro-reflector.

Figure 2A:
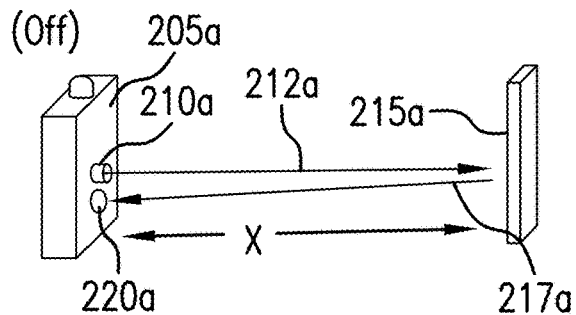
FIGS. 2A, 2B, 2C, 2D and 2E depict perspective views of exemplary use cases of an RRPES, detailing the advantage of added photo-detector(s) on maximum deployment length.

FIGS. 2A, 2B, 2C, 2D and 2E depict perspective views of exemplary use cases of an RRPES, detailing the advantage of an added photo-detector on maximum deployment length. In FIG. 2A, an RRPES 205a, includes a photoelectric emitter 210a. The photoelectric emitter 210a emits a transmitted beam of light 212a to a retro-reflector 215a. The retro-reflector 215a reflects a reflected beam of light 217a back toward the RRPES 205a where it strikes a photo-detector 220a. In some examples, an unobstructed beam, as shown in FIG. 2A, may indicate an unblocked or unobstructed output state from the RRPES 205a.

Figure 2B:
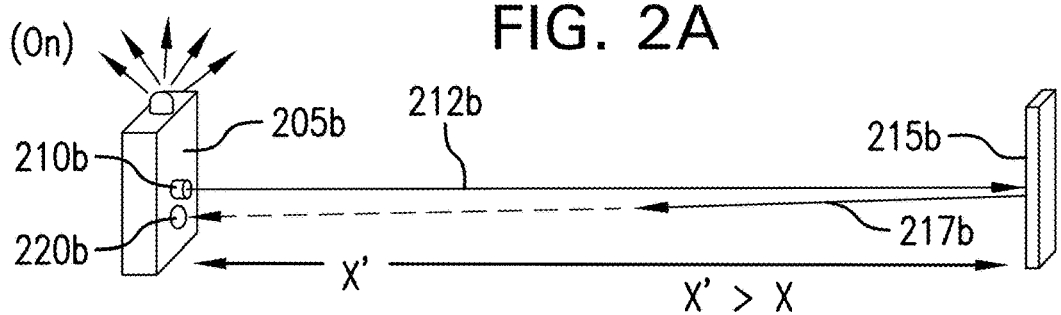

In FIG. 2B, an RRPES retro-reflector 215b is now moved a substantial distance further from an RRPES 205b. The RRPES 205b includes a photoelectric emitter 210b. The photoelectric emitter 210b emits a transmitted beam of light 212b to the retro-reflector 215b. The retro-reflector 215b reflects a reflected beam of light 217b back toward the RRPES 205b, however since the distance between the retro-reflector 215b and the RRPES 205b is much greater than the distance illustrated in FIG. 2A, when the beam strikes a photo-detector 220b, it is much weaker in intensity due to the distance traveled, and therefore the sensor count is below a predetermined threshold. In an illustrative example, the weaker reflected beam of light 217b may lower the signal-to-threshold ratio. In some examples, a low signal-to-threshold ratio, as shown in FIG. 2B, may incorrectly indicate a blocked or obstructed output state from the RRPES 205b. In some embodiments, the design may balance increased sensitivity, which may advantageously provide increased range, with degraded disturbance rejection to a white card's diffused reflected light.

Figure 2C:
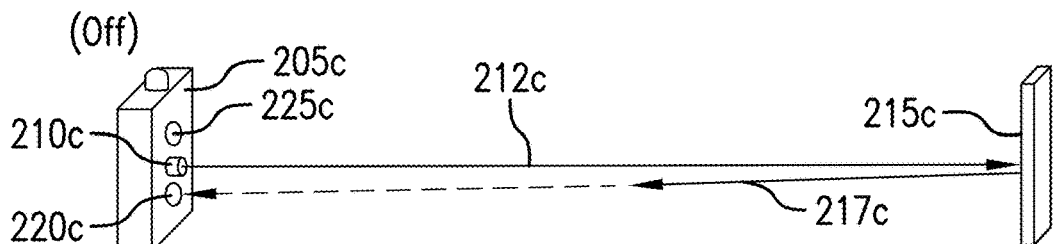

In FIG. 2C, an RRPES 205c with a lower threshold, includes a photoelectric emitter 210c. The photoelectric emitter 210c emits a transmitted beam of light 212c to a retro-reflector 215c. The retro-reflector 215c reflects a reflected beam of light 217c back toward the RRPES 205c, where it strikes a photo-detector 220c. The addition of a monitor photo-detector 225c to the RRPES 205c enables the use of a lower threshold in the RRPES 205c, the weaker signal from the further-placed retro-reflector 215c is still above this lower threshold extending the detection range.

Figure 2D:
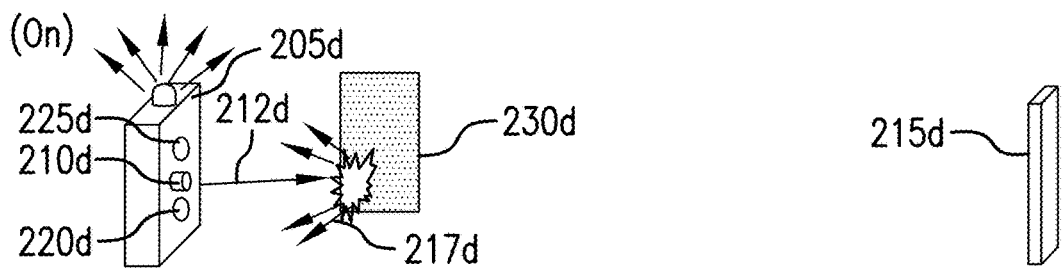

In FIG. 2D, an RRPES 205d with the lower threshold, includes a photoelectric emitter 210d. The photoelectric emitter 210d emits a transmitted beam of light 212d to a retro-reflector 215d. A limited reflectance absorptive obstruction 230d prevents the RRPES 205d transmitted beam of light 212d from reaching the retro-reflector 215d. The reflected light 217d from the RRPES 205d has been blocked from reflecting back to photo-detectors 220d and 225d. Even with the lower threshold of the RRPES 205d, the very weak signal from the diffuse low reflectance absorptive obstruction 230d is still below the predetermined threshold. In some examples, a very weak reflected light 217d, from the diffuse low reflectance obstruction 230d, as shown in FIG. 2D, may indicate a blocked or obstructed output state from the RRPES 205d with a lower threshold.

Figure 2E:
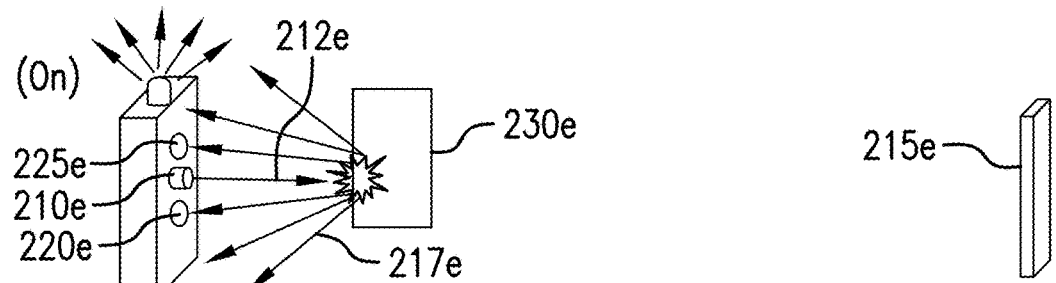

In FIG. 2E, an RRPES 205e with the lower threshold, includes a photoelectric emitter 210e. The photoelectric emitter 210e emits a transmitted beam of light 212e to a retro-reflector 215e. A white, reflective obstruction 230e prevents the RRPES 205e transmitted beam of light 212d from reaching the retro-reflector 215e. The reflected light 217e from the RRPES 205e backscatters to a primary photo-detector 220e and to a monitor photo-detector 225e. With the lower predetermined threshold of the RRPES 205e, the signal from the white, reflective obstruction 230e may normally be above the predetermined threshold and exhibit a false pass (indicating unblocked or unobstructed output state), however the RRPES 205e bases its output state on both of the photo-detectors 220e and 225e. In some embodiments, the output state of the RRPES 205e may indicate a blocked or obstructed output state when the monitor photo-detector 225e registers a signal above a second predetermined, near-zero threshold, or if the primary photo-detector 220e, is below the lower predetermined threshold. In some examples, a backscattered beam from the white, reflective obstruction, as shown in FIG. 2E, may correctly indicate a blocked or obstructed output state from the RRPES 205e with a lower threshold and with the two photo-detectors 220e and 225e.

Figure 3A:
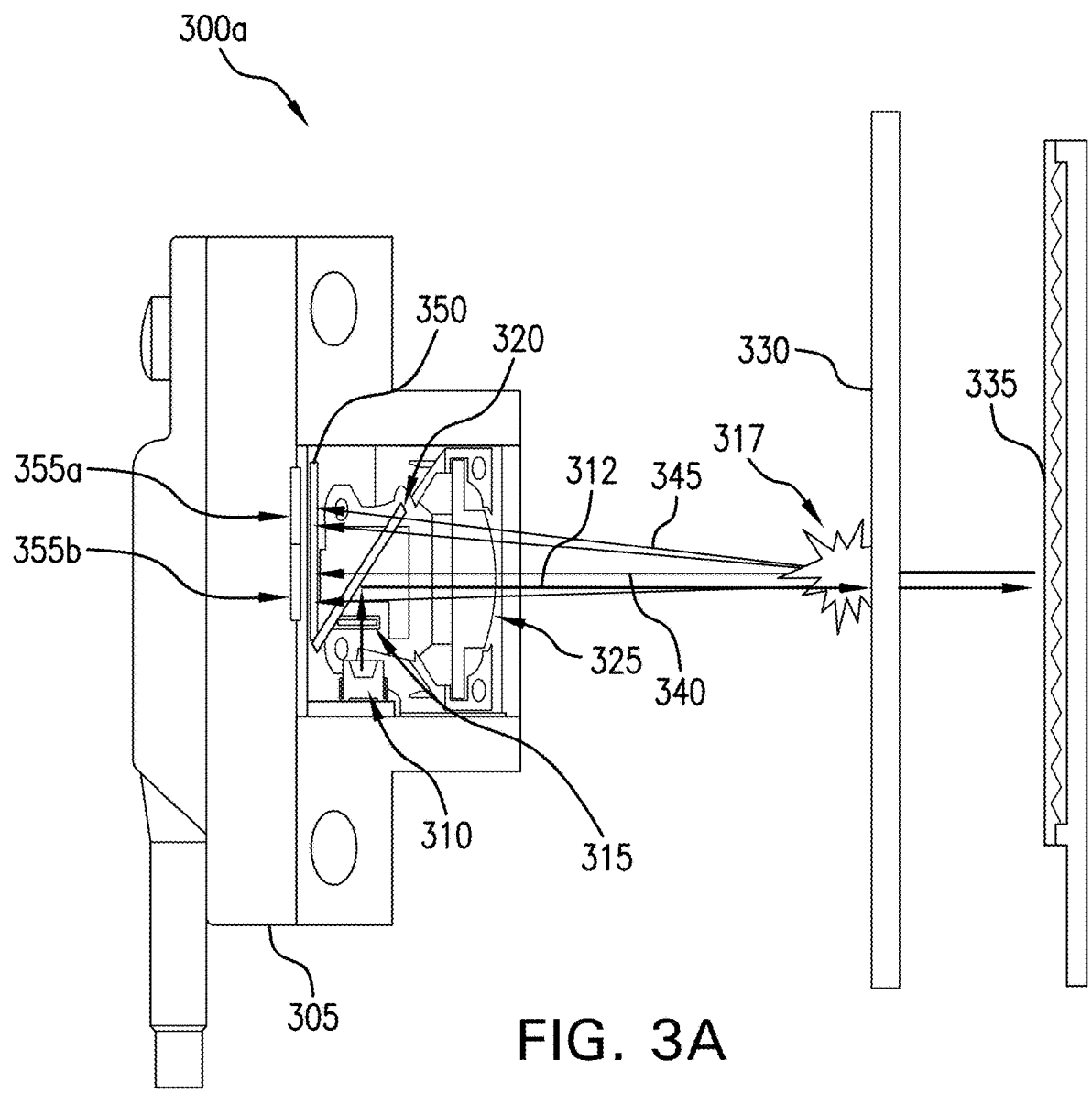
FIG. 3A depicts a side elevation view of an exemplary single lens RRPES, detailing the detection of off-axis light scattered from a white card.

FIG. 3A depicts a side elevation view of an exemplary single lens RRPES, detailing the detection of off-axis light scattered from a white card. A white card test scenario 300a, includes a single lens RRPES 305. The single lens RRPES includes an emitter 310. The emitter 310 directs a transmitted light beam 312 through a filter 315. In some examples, the filter 315 may be a polarizing filter, for example, operable to selectively filter out improperly polarized light. Following the filter 315, the transmitted light beam 312 is directed to a beam splitter 320. The beam splitter 320 reflects the transmitted light beam 312 from the emitter 310, through a single lens 325. In some embodiments, the single lens 325 may be implemented as a compound set of coaxial lenses, for example. The transmitted light beam 312 continues toward a retro-reflector 335. The generated light beam comes short of reaching the retro-reflector 335, and instead encounters a white card 330. The white card 330 may scatter the transmitted light beam into a hemisphere of reflected light beams 317.

Some of the reflection from the reflected light beams 317, scattered by the white card 330, follows a parallel path of reflected light 340 substantially parallel to the transmitted light beam 312. The parallel reflected light 340, following parallel to the transmitted light beam 312, makes its way back through the single lens 325 and through the beam splitter 320. The parallel reflected light 340 travels through a filter 350. In some examples, the filter 350 may be a polarizing filter, for example, operable to selectively filter out improperly polarized light. After traveling through the filter 350 the parallel reflected light 340 lands on a primary photo-detector 355b.

A beam of off-axis light 345, from the transmitted light beam 312, scattered by the white card 330, follows an off-axis path. The off-axis light 345 makes its way back through the single lens 325 and through the beam splitter 320. The off-axis light 345 travels through the filter 350. After traveling through the filter 350, the off-axis light 345 lands on a monitor photo-detector 355a.

In some embodiments, the light detected from the photo-detectors 355a and 355b are subtracted from one another. The difference signal from a white card may be used to set a threshold which may indicate a locked or obstructed output state of the single lens RRPES 305.

Figure 3B:
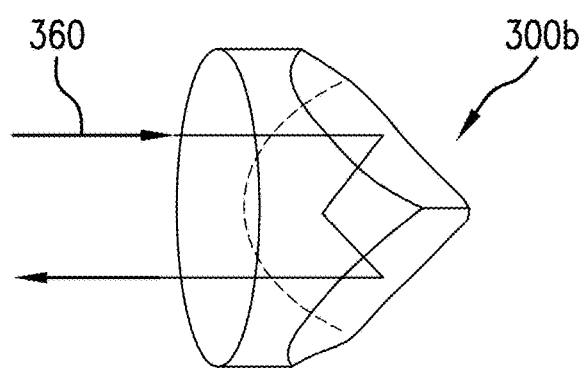
FIG. 3B depicts a side elevation view of an exemplary corner cube geometry.

FIG. 3B depicts a side elevation view of an exemplary corner cube geometry. A corner cube 300b is radiated with a transmitted light beam 360. The transmitted light beam 360 reflects off the facets of the corner cube 300b. The light beam reflections within the corner cube 300b, reflect back in parallel with, and in the opposite direction of, the originating transmitted light beam 360. In an illustrative example, corner cubes 300b may be employed in a retro-reflector, advantageously providing a non-dispersive, reflective surface.

In some examples, corner cubes 300b may be painted onto a wall surface, and may provide a permanent retro-reflective function, for example, without polarizers in the optical path. In some embodiments corner cubes 300b may be applied as a self-adhesive strip to a strategic surface, and again may provide a permanent retro-reflective function. In some examples, the retro-reflector may be a one-corner-cube implementation or consist of one or more micro spheres.

Figure 4:
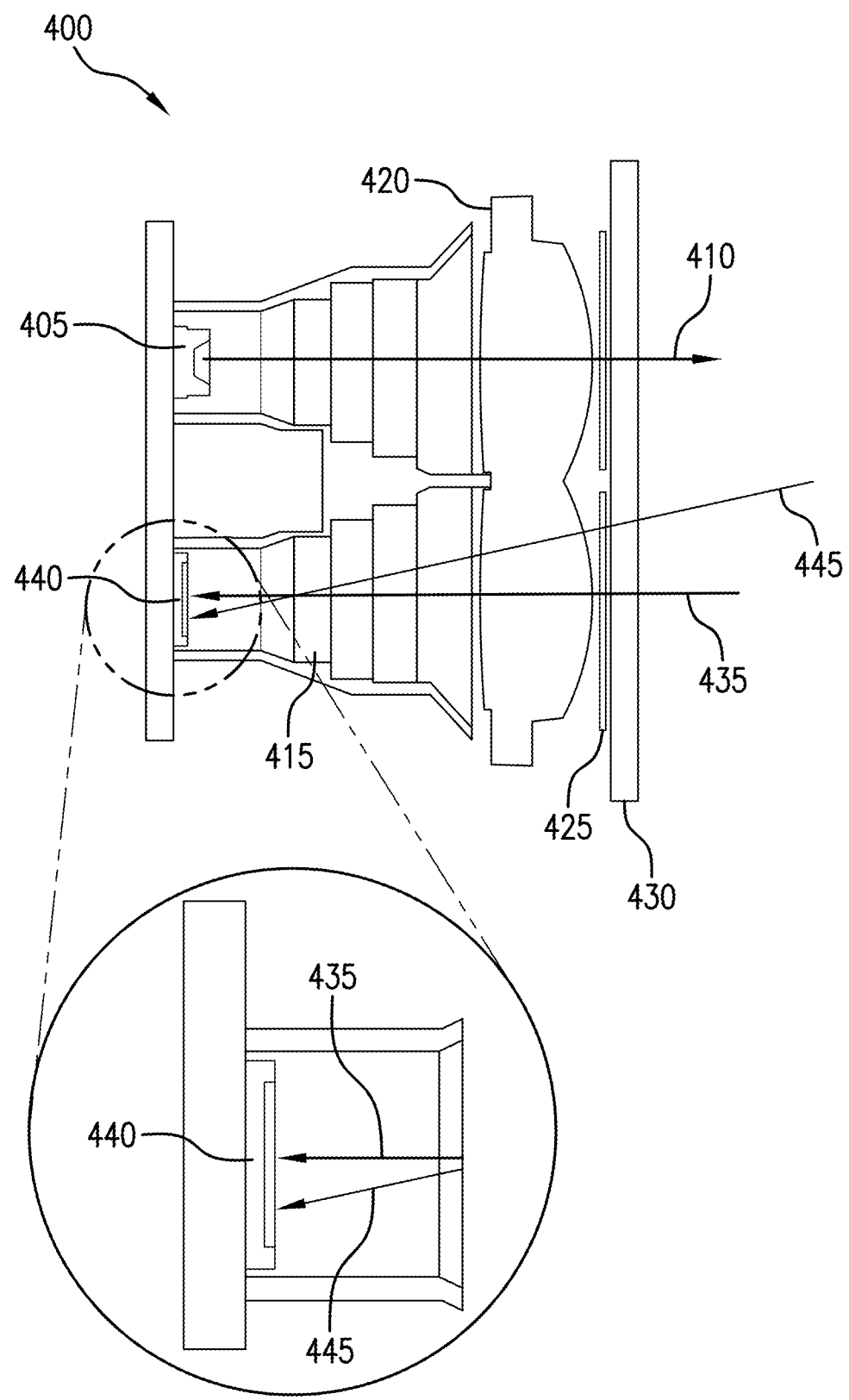
FIG. 4 depicts a side elevation view of an exemplary two-lens RRPES.

FIG. 4 depicts a side elevation view of an exemplary two-lens RRPES. A two-lens RRPES 400 includes a photo emitting diode 405. The photo emitting diode 405 emits a transmitted light beam 410 through an optical baffle 415. After the optical baffle 415, the transmitted light beam 410 travels through a bifurcated lens 420. After the bifurcated lens 420, the transmitted light beam 410, travels through a filter 425. In some examples, the filter 425 may be a polarizing filter, for example, operable to selectively filter out improperly polarized light. After the polarizing filter 425, the transmitted light beam travels through a front window 430.

When the transmitted light beam 410 strikes a retro-reflector (not shown), it returns as an on-axis light beam 435. The on-axis light beam 435 travels through the front window 430. After the front window 430, the on-axis light beam 435 travels through the filter 425. In some examples, the filter 425 may be a polarizing filter, for example, operable to selectively filter out improperly polarized light. After the filter 425, the light on-axis beam 435 travels through the bifurcated lens 420. After leaving the bifurcated lens 420, the on-axis light beam 435 strikes a multi-pixel photo-detector 440. In some examples, the on-axis light beam 435 strikes the multi-pixel photo-detector 440, in a tight cluster, near the center of the photo-detector 440.

When the transmitted light beam 410 strikes a white card or other white object (not shown), the light beam 410 scatters in many directions, and some reflected light may return to the RRPES 400 as off-axis light beams, which includes an off-axis light beam 445. The off-axis light beam 445 travels through the front window 430. After the front window 430, the off-axis light beam 445 travels through the filter 425. After the filter 425, the off-axis light beam 445 travels through the bifurcated lens 420. After leaving the bifurcated lens 420, the off-axis light beam 445 strikes the multi-pixel photo-detector 440. In some examples, the off-axis light beam 445 strikes the multi-pixel photo-detector 440, in a wide scattered cluster, near the edge of the multi-pixel photo-detector 440. In some examples, the bifurcated lens 420 may advantageously eliminate the need for the beam splitter (FIG. 3A, reference 320). In some embodiments, the bifurcated lens 420 may be implemented using two discrete lenses, for example.

Figure 5A:
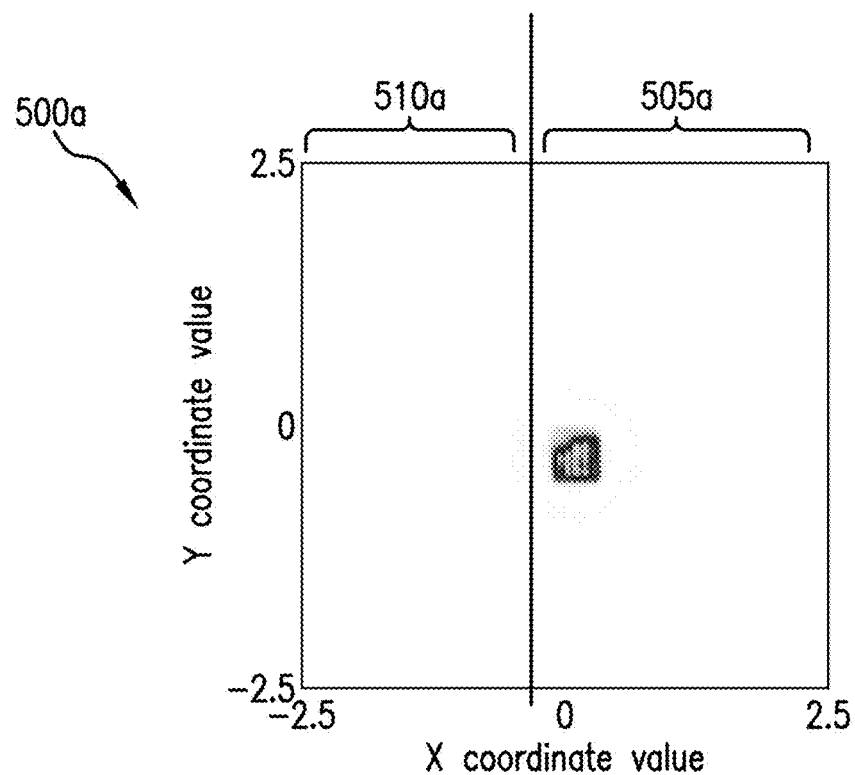
FIG. 5A depicts a plan view of an exemplary pixel scatter map, detailing a multi-pixel photo-detector, with an image from a retro-reflector.

FIG. 5A depicts a plan view of an exemplary pixel scatter map, detailing a multi-pixel photo-detector, with an image from a retro-reflector. A retro-reflector pixel scatter map 500*a* is shown magnified many times and divided into a primary photo-detector area 505*a*, and a monitor photo-detector area 510*a*. The primary photo-detector area 505*a*, includes an image created from the reflected light from a retro-reflector. The monitor photo-detector area 510*a* includes no images, since there were no light beam hits. In some examples, the image from the retro-reflector, is in a tight cluster in the primary photo-detector area 505*a* and is not scattered into the monitor photo-detector area 510*a* on the opposite side of the bifurcation boundary.

Figure 5B:
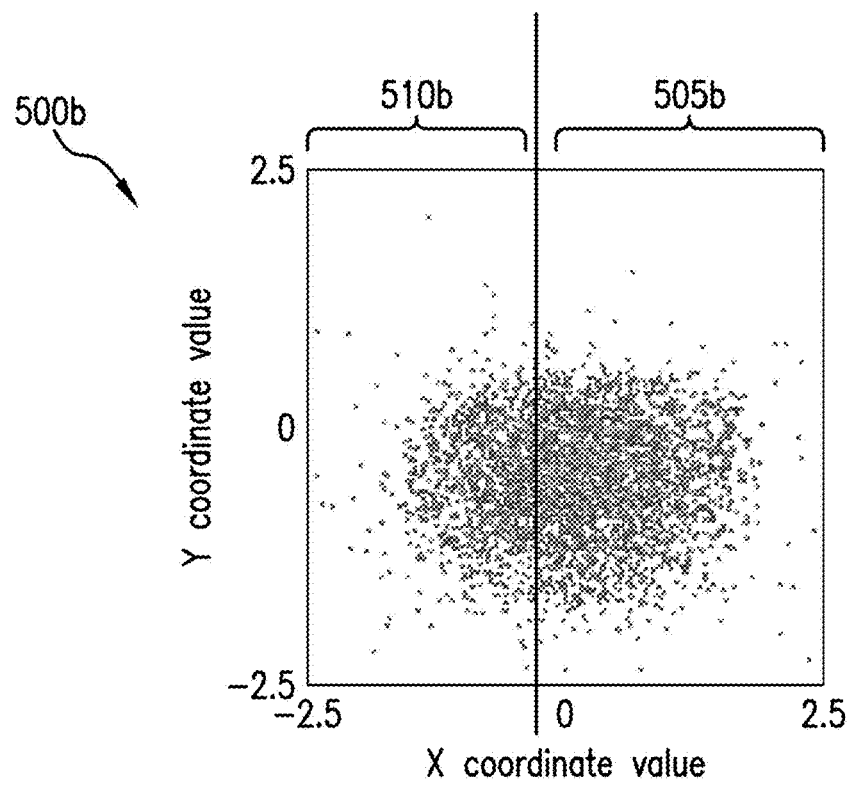
FIG. 5B depicts a plan view of an exemplary pixel scatter map detailing a multi-pixel photo-detector, with an image from a white card.

FIG. 5B depicts a plan view of an exemplary pixel scatter map detailing a multi-pixel photo-detector, with an image from a white card. In contrast, a white card pixel scatter map 500*b* is shown magnified many times and divided into a primary photo-detector area 505*b*, and a monitor photo-detector area 510*b*. The primary photo-detector area 505*b*, includes an image created from the reflected light from a white card. The monitor photo-detector area 510*b* also includes an image created from the reflected light from a white card. In some examples, the image from the white card, may be widely scattered on both sides of the bifurcated boundary, and may land nearly evenly in both the primary photo-detector area 505*b*, and the monitor photo-detector area 510*b*.

Figure 5C:
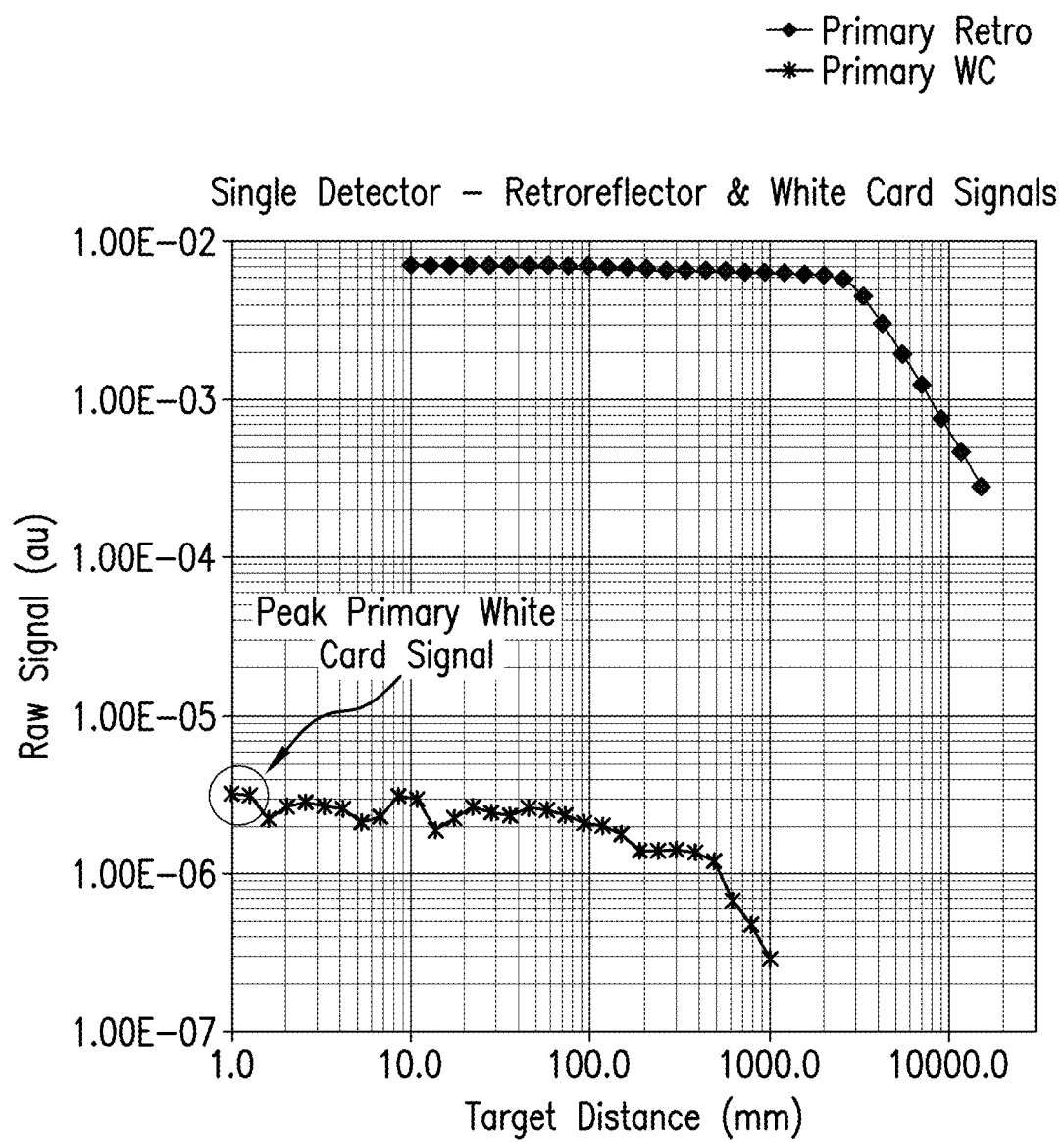
FIG. 5C depicts an exemplary single-photo-detector RRPES signal plot vs. target distance, for both retro-reflector and white card signals.

FIG. 5C depicts an exemplary single-photo-detector RRPES signal plot vs. target distance, for both retro-reflector and white card signals.

In an illustrative object detection example, performance of an optical sensor may be measured based on "excess gain." In this example, excess gain may be determined according to the ratio of the sensor's received signal divided by its detector threshold level. An excess gain of 1 may be, in various implementations, considered to be a minimum signal level required for detection. For a retro-reflective sensor application, some embodiments may benefit from at least a graphical plot of the excess gain on a log-log scale, with excess gain on the vertical axis and distance to a retro-reflector on the horizontal axis.

In an illustrative excess gain example, a single, primary, on-axis, photo-detector retro-reflective sensor system may record the optical signal level on a photo-detector in separate responses to a white card target and a retro-reflector target with changing target distance.

Example signal levels are plotted in FIG. 5C. The peak white card signal is noted in FIG. 5C. This peak white card signal can be used as the threshold level of the sensor.

Figure 5D:
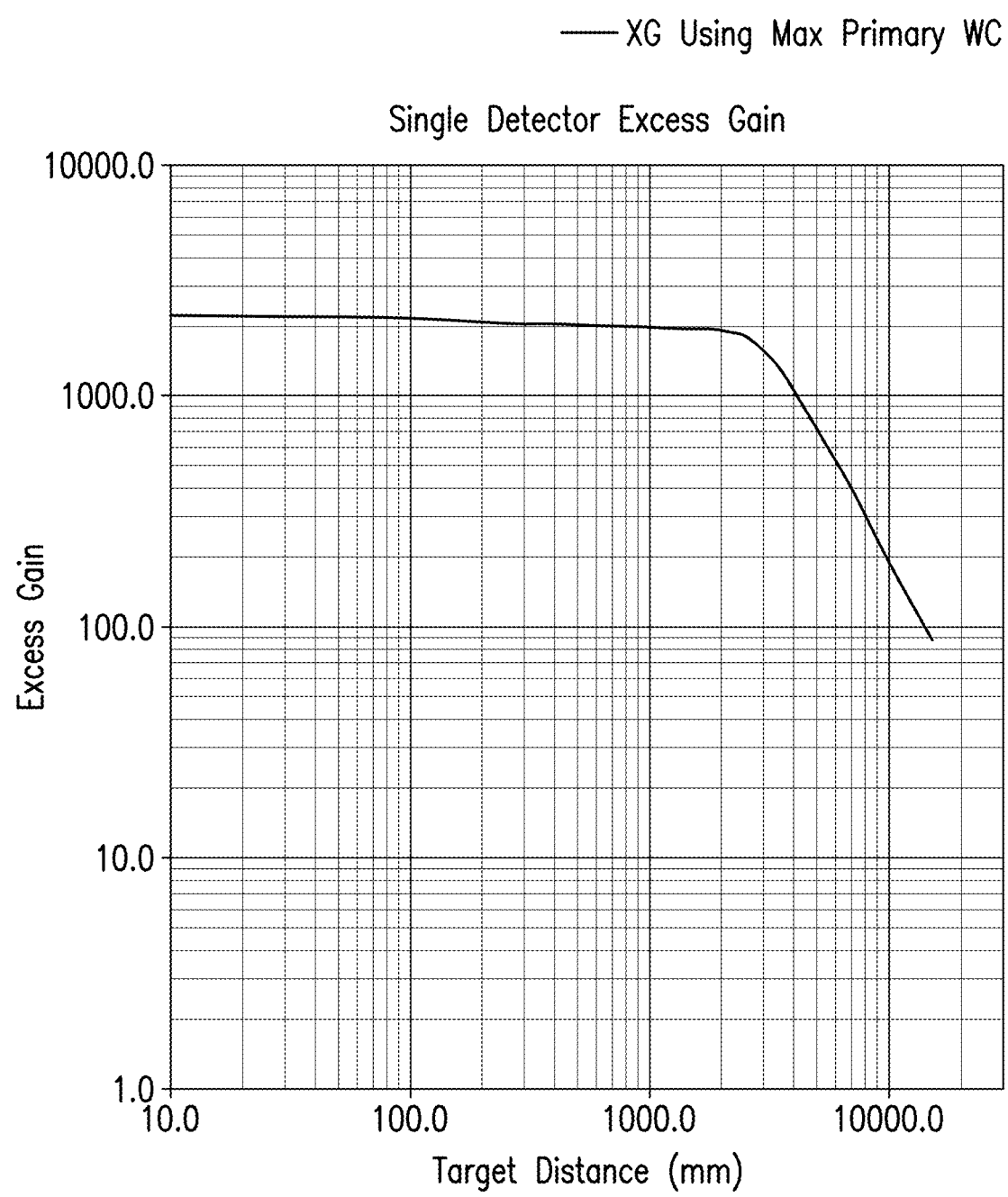
FIG. 5D depicts an exemplary single-photo-detector RRPES excess gain plot vs. target distance.

FIG. 5D depicts an exemplary single-photo-detector RRPES excess gain plot vs. target distance. In the depicted example, the excess gain curve of FIG. 5D can be calculated by dividing the primary retro-reflector signals of FIG. 5C by the threshold level of the peak white card signal of FIG. 5C. In some examples, without a bifurcated photo-detector, the excess gain may be at a benchmark level.

Figure 5E:
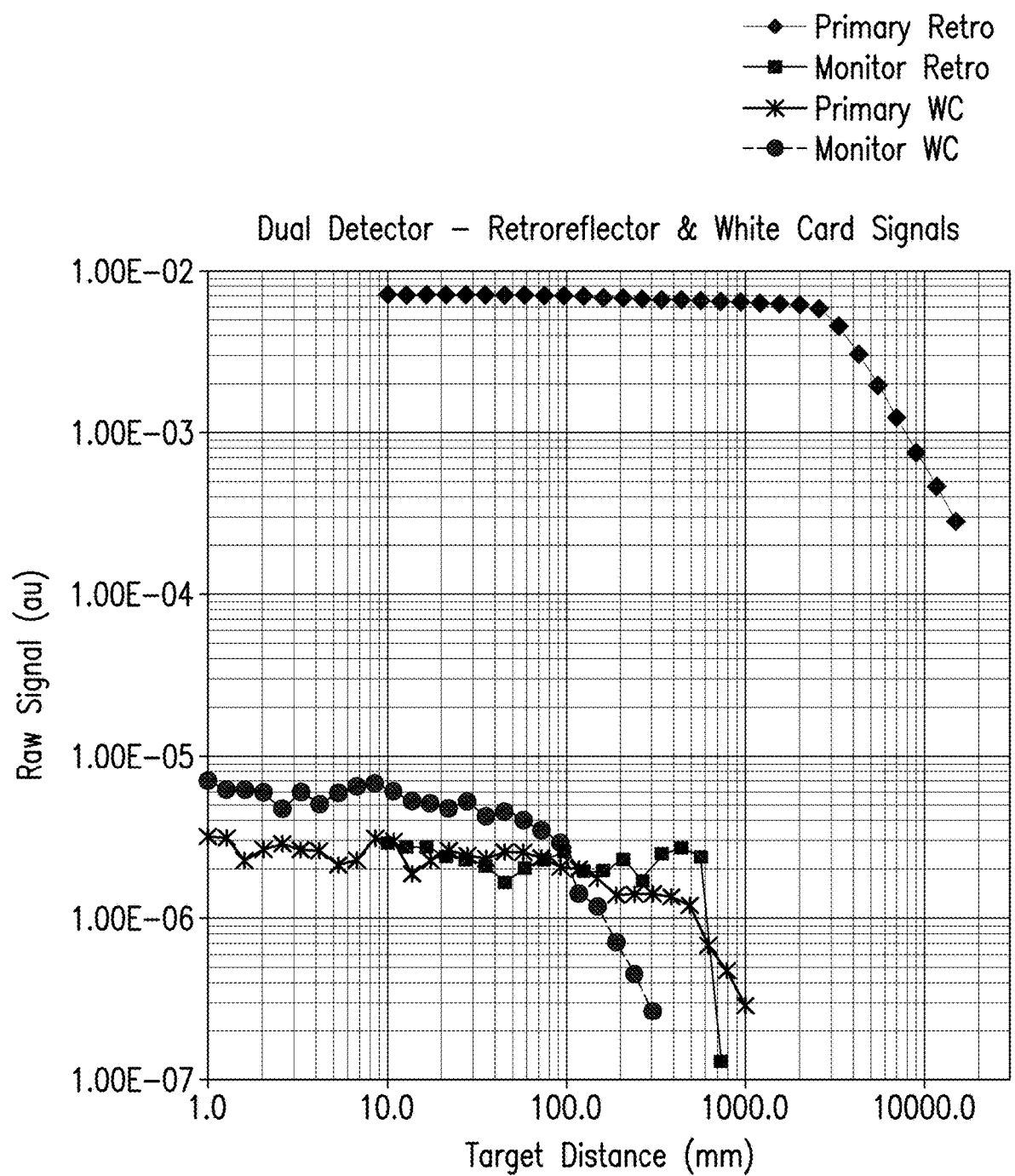
FIG. 5E depicts an exemplary dual-photo-detector RRPES signal plot vs. target distance, for both retro-reflector and white card signals.

FIG. 5E depicts an exemplary dual-photo-detector RRPES signal plot vs. target distance, for both retro-reflector and white card signals.

In an illustrative excess gain example, a multi-pixel photo-detector retro-reflective sensor system, as shown in FIGS. 5A and 5B, may record the optical signal levels on multiple photo-detectors in separate responses to a white card target and a retro-reflector target with changing target distance. Example signal levels are shown in FIG. 5E and show signal levels from a primary photo-detector (the same as in FIG. 5C) and a second, monitor photo-detector that is adjacent to the primary photo-detector and is off-axis from the retro-reflective signal path. The signals in FIG. 5E show a difference in signal shape and signal level for the two different photo-detectors. One example of using these differences in signals between the primary and monitor is to take the difference of the monitor from the primary.

Figure 5F:
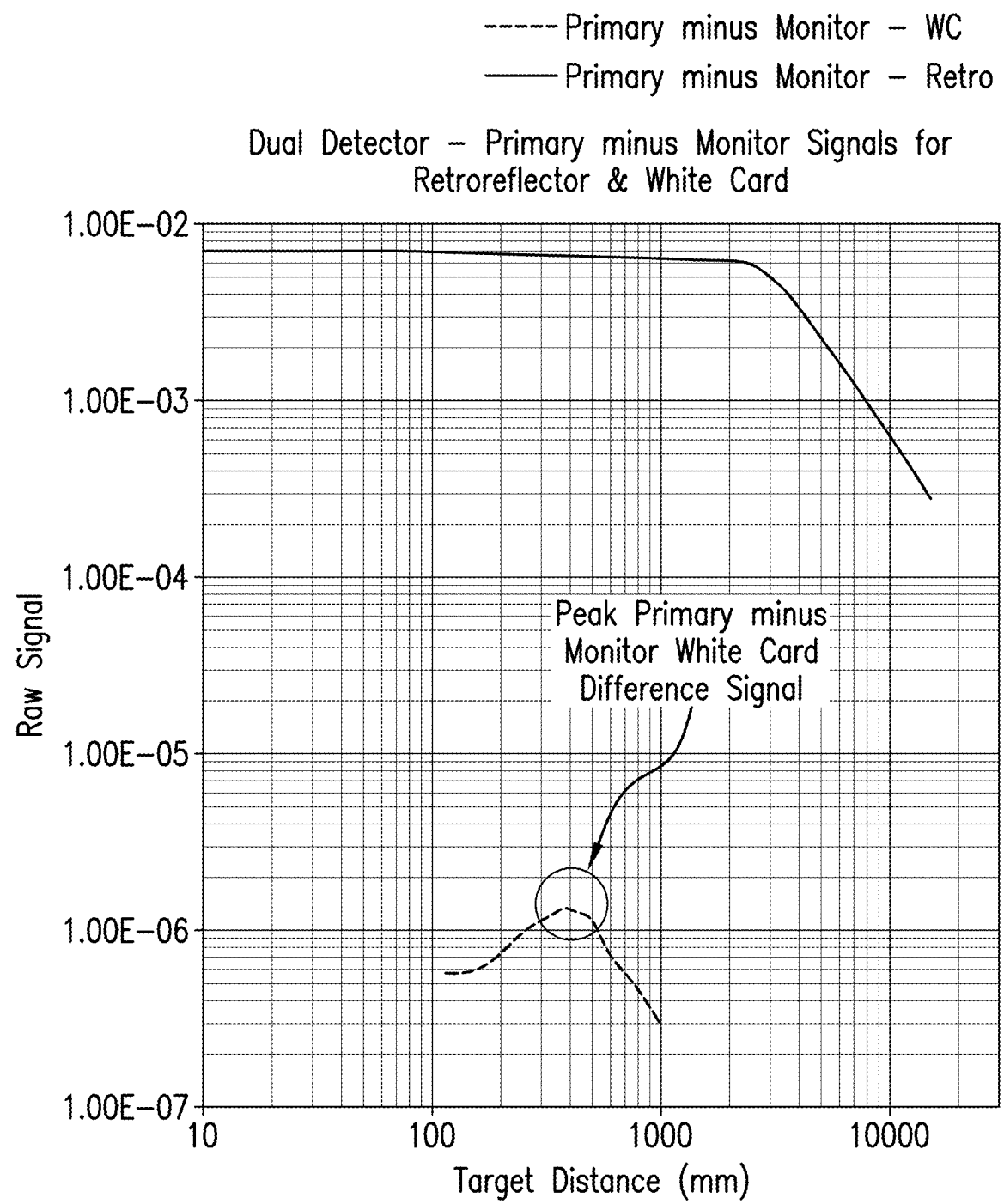
FIG. 5F depicts an exemplary RRPES signal difference plot vs. target distance, for both retro-reflector and white card signals.

FIG. 5F depicts an exemplary RRPES signal difference plot vs. target distance, for both retro-reflector and white card signals.

For the signal levels of FIG. 5E, the differences of the retro-reflector signals and the white card signals are plotted in FIG. 5F. Because of the large primary signal level and small monitor signal level of the retro-reflector signal, its primary minus monitor signal level is essentially unchanged from the original primary signal level. In contrast, the primary signal level and monitor signal level of the white card are of similar levels and its primary minus monitor signal level is a new shape and has a lower peak than the white card monitor signal by itself. As an example, the peak of the white card difference signal level shown in FIG. 5F can be used as the sensor's threshold level.

Figure 5G:
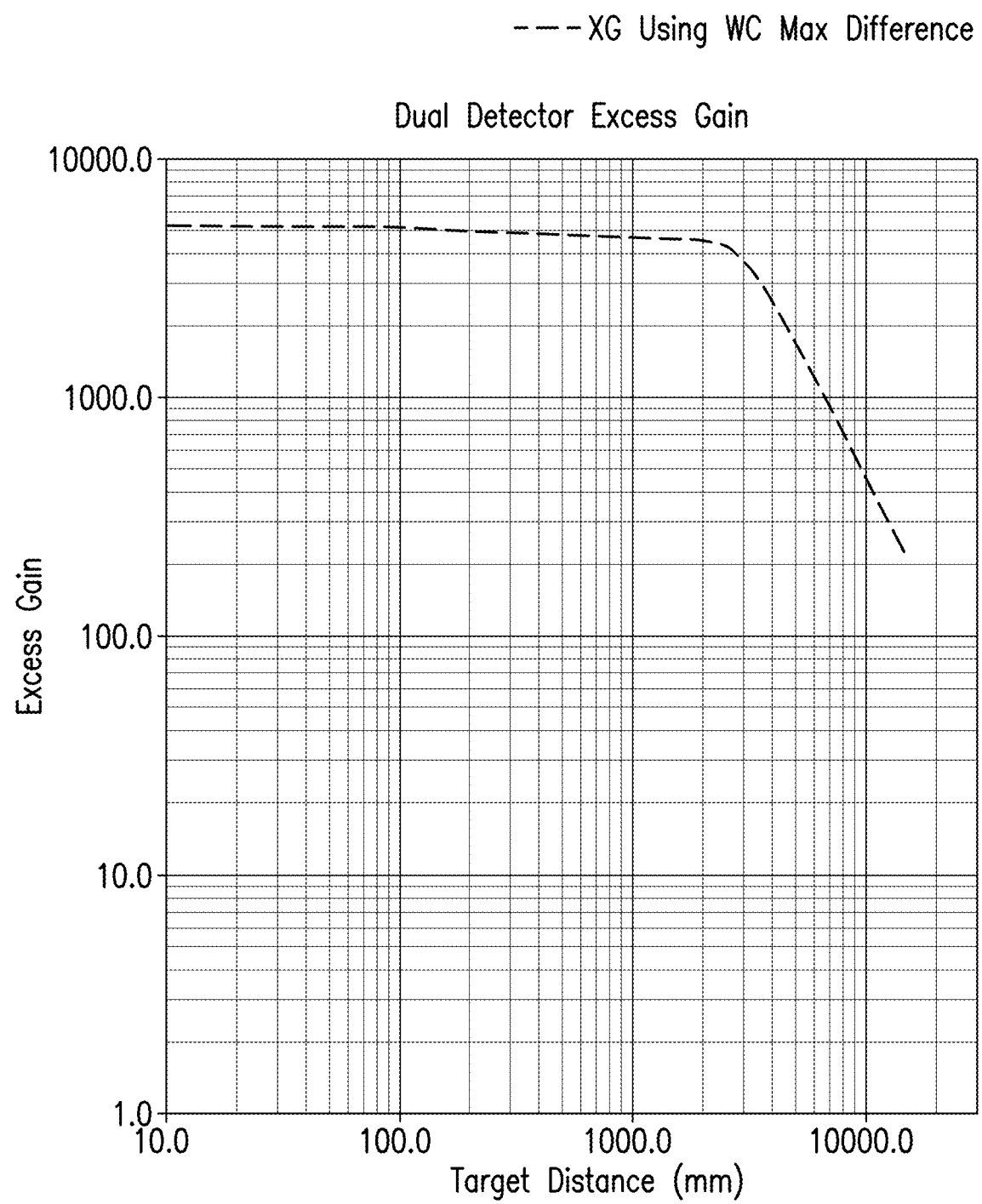
FIG. 5G depicts an exemplary dual-photo-detector RRPES excess gain plot vs. target distance.

FIG. 5G depicts an exemplary dual-photo-detector RRPES excess gain plot vs. target distance.

The excess gain curve of FIG. 5G can be calculated by dividing the primary minus monitor retro-reflector signals of FIG. 5F by the threshold level of the peak white card primary minus monitor signal of FIG. 5F.

Figure 5H:
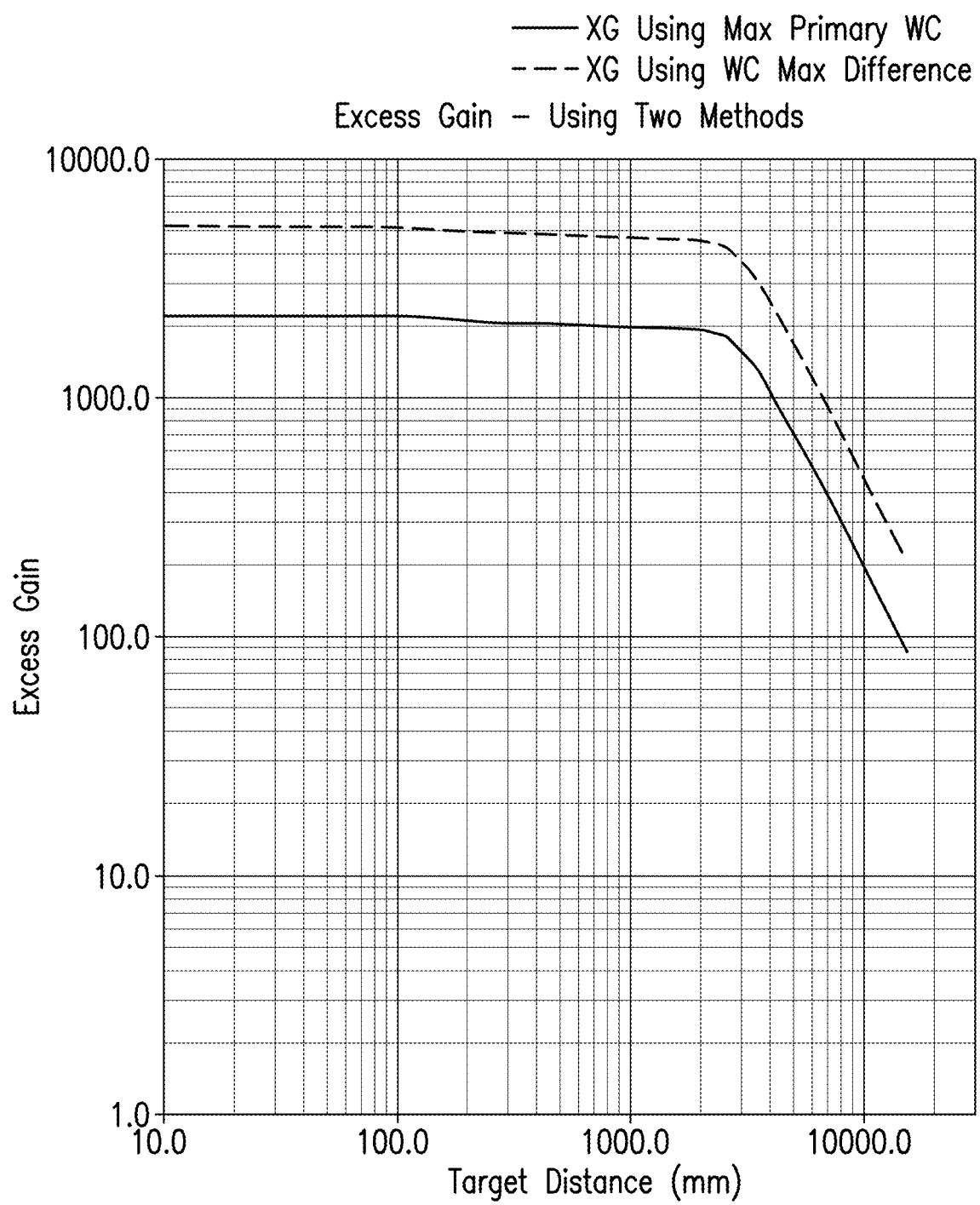
FIG. 5H depicts an exemplary single-photo-detector and dual-photo-detector RRPES comparison excess gain plot vs. target distance.

FIG. 5H depicts an exemplary single-photo-detector and dual-photo-detector RRPES comparison excess gain plot vs. target distance.

Because the threshold derived from the peak white card primary minus monitor signal level of FIG. 5F is lower than the threshold derived from the peak white card monitor signal level of FIG. 5C alone, the excess gain level of the multi-detector sensor is increased (improved) as shown in FIG. 5H which may advantageously yield, for example, longer detectable distances between an RRPES and a retro-reflector or more robust detection.

Figure 6:
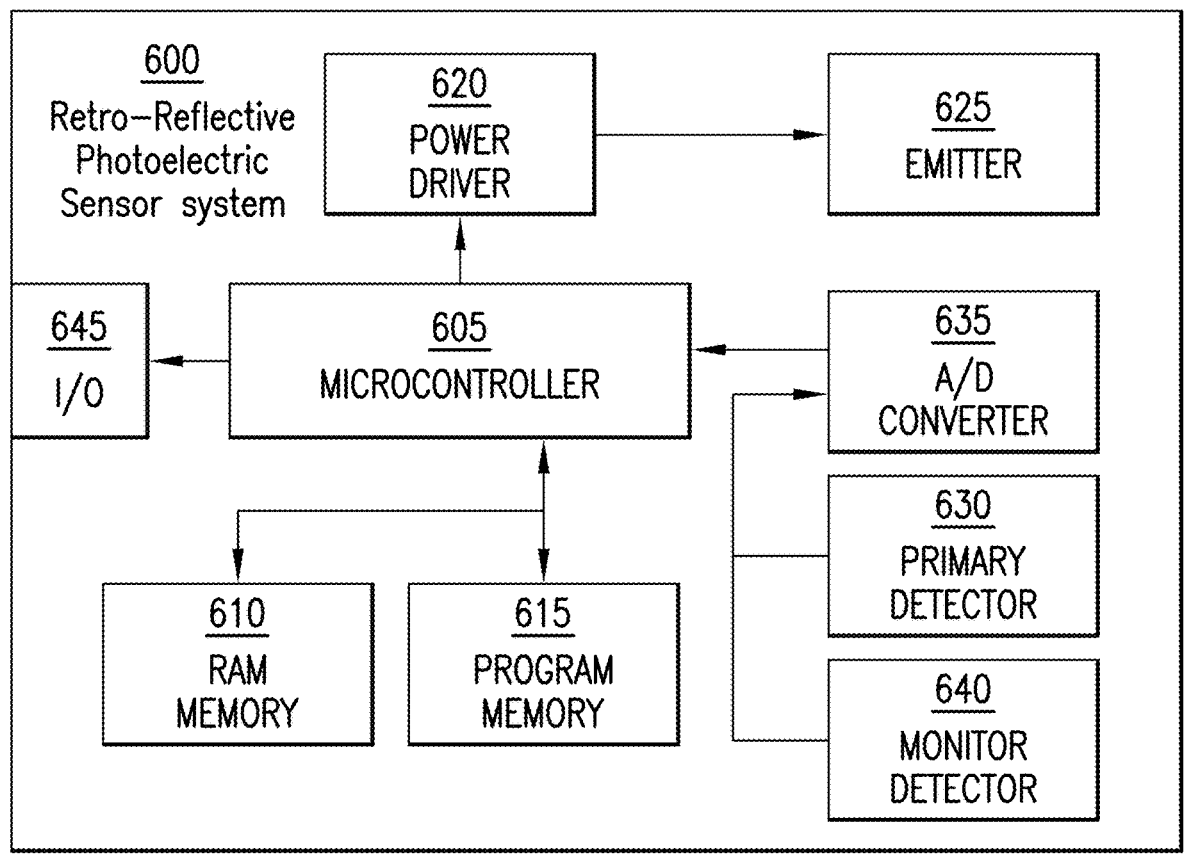
FIG. 6 depicts a schematic view of an exemplary RRPES block diagram.

FIG. 6 depicts a schematic view of an exemplary RRPES block diagram. A retro-reflective photoelectric sensor system 600 includes a microcontroller 605. The microcontroller 605 is operably connected to a RAM memory 610 and a program memory 615. The microcontroller 605 controls a power driver 620. The power driver 620 drives a photoelectric emitter 625. Light from the photoelectric emitter 625 is externally reflected and returns to a primary photo-detector 630. The primary photo-detector 630 is operably connected to an A/D converter 635. The A/D converter 635 measures the detected light on the primary photo-detector 630. The A/D converter 635 then sends the measurement of the detected light from the primary photo-detector 630 to the microcontroller 605. The A/D converter 635 also measures the detected light on a secondary (monitor) photo-detector 640. The A/D converter 635 then sends the measurement of the detected light from the monitor photo-detector 640 to the microcontroller 605. In some examples, the photo-detectors 630, 640 may include one or more pixels that may be individually sampled. In some embodiments, the converter 635 may receive an aggregated signal representative of the intensity and/or size of an incident light beam. The microcontroller 605 also controls an input-output (I/O) connector 645. In some examples, the microcontroller 605 may send an obstructed signal to the I/O connector 645 when the beam sent by the emitter 625 is obstructed such that it is determined to be not returning to the primary photo-detector 630.

Figure 7A:
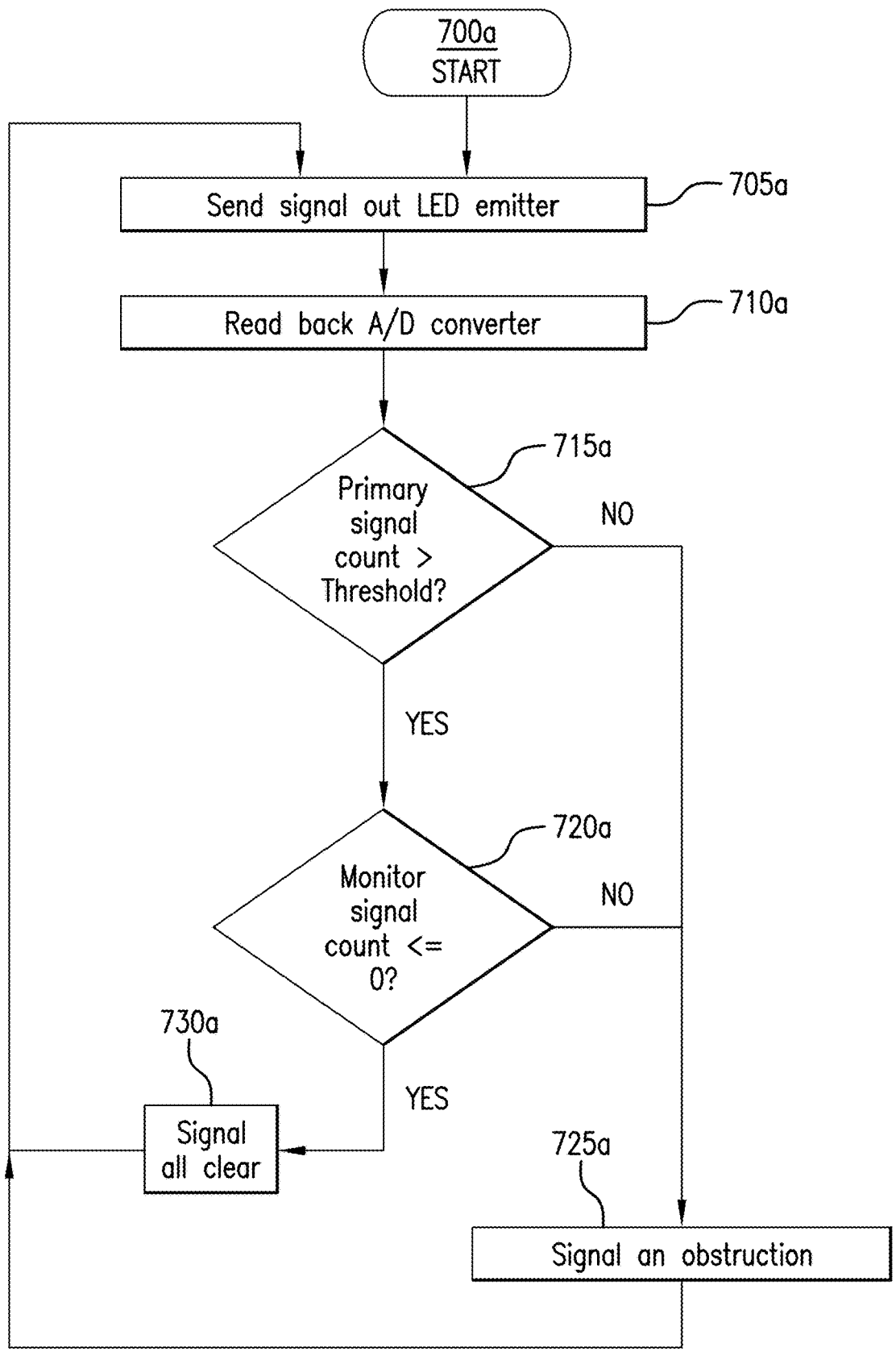
FIG. 7A depicts a flowchart detailing the process flow of an exemplary RRPES.

FIG. 7A depicts a flowchart detailing the process flow of an exemplary RRPES. An RRPES process starts 700a, by sending a signal out an LED emitter 705a. The reflected light, from both the primary and monitor photo-detectors, is then read back through an A/D converter 710a.

If the primary signal count is not greater than the predetermined threshold 715a, then the RRPES signals an obstruction 725a. Next, execution flows back to the top of the loop, and repeats.

If the primary signal count is greater than a predetermined threshold 715a, and, if the monitor signal count is not less than or equal to zero 720a, then the RRPES signals an obstruction 725a. Next, execution flows back to the top of the loop and repeats.

If the primary signal count is greater than the predetermined threshold 715a, and, if the monitor signal count is less than or equal to zero 720a, then the RRPES signals all clear 730a. Next, execution flows back to step 705a.

Figure 7B:
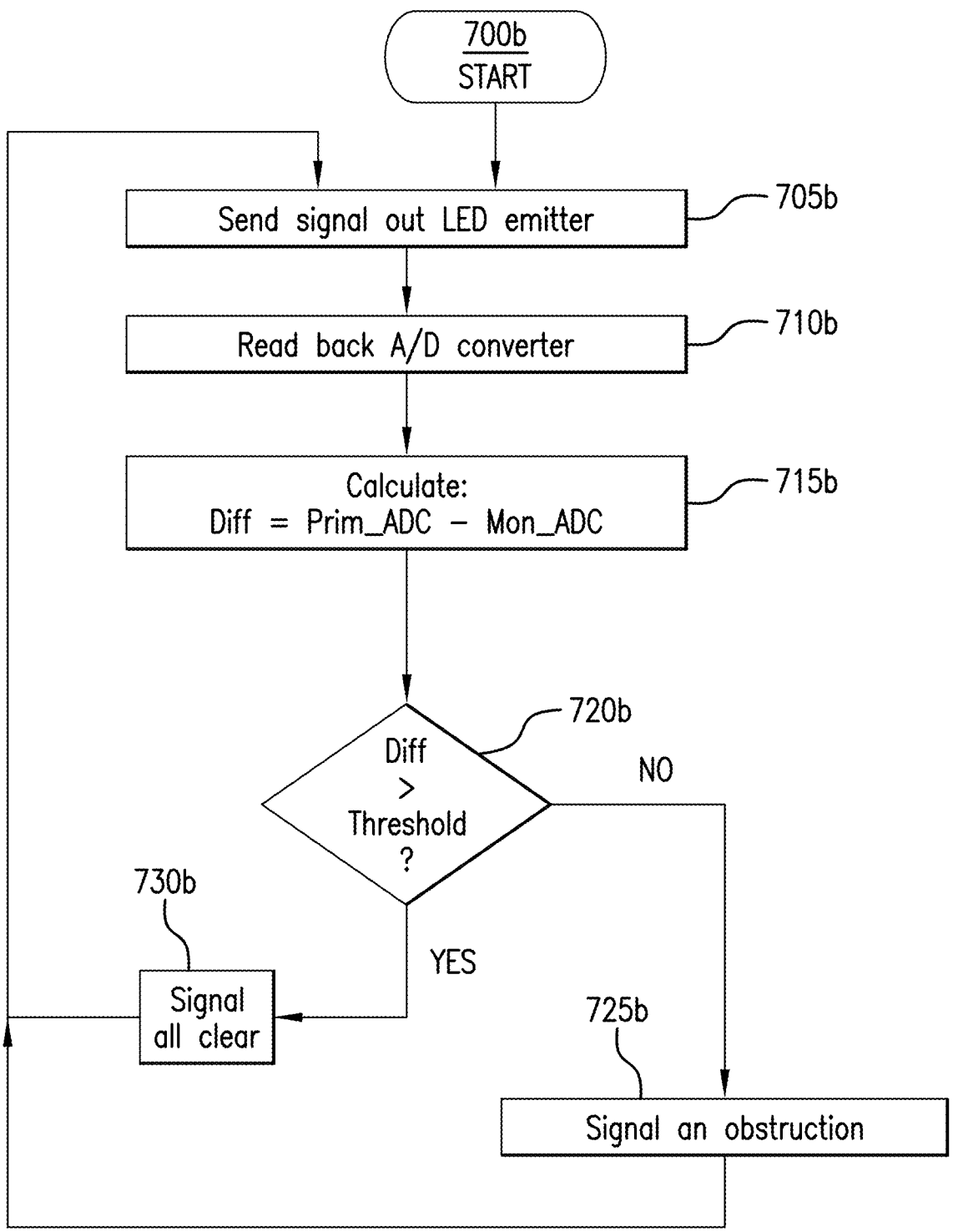
FIG. 7B depicts a flowchart detailing the process flow of an alternative exemplary RRPES.

FIG. 7B depicts a flowchart detailing the process flow of an exemplary RRPES. An RRPES process starts 700b, by sending a signal out an LED emitter 705b. The reflected light, from both the primary and monitor photo-detectors, is then read back through an A/D converter 710b. The process then calculates the difference between the primary A/D detector counts and the monitor A/D detector counts, and assigns the value to a "diff" variable 715b.

If the diff value is greater than a predetermined threshold, then the RRPES signals all clear 730b. Next, execution flows back to the top of the loop and repeats.

If the diff value is not greater than a predetermined threshold, then the RRPES signals an obstruction 725b. Next, execution flows back to the step 705b.

Figure 8A:
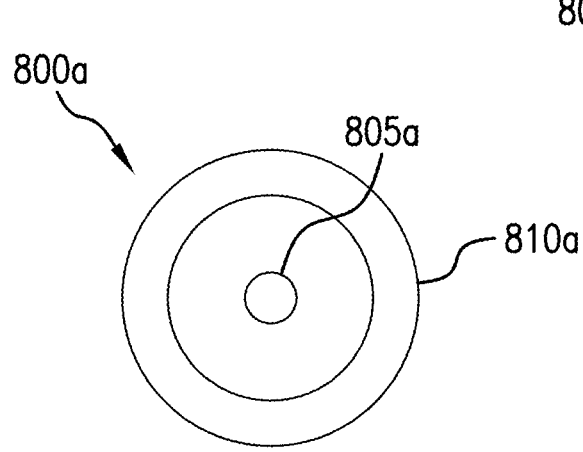
FIG. 8A depicts an exemplary annular monitor photo-detector surrounding a primary photo-detector.

FIG. 8A depicts an exemplary annular monitor photo-detector surrounding a primary photo-detector. A photo-detector arrangement 800a includes a primary photo-detector 805a. The primary photo-detector 805a, is surrounded by a monitor photo-detector 810a shaped in an annular ring. In some examples, with the monitor photo-detector 810a shaped in an annular ring, an off-axis reflected light beam may be detected from beams incident in an off-axis direction.

Figure 8B:
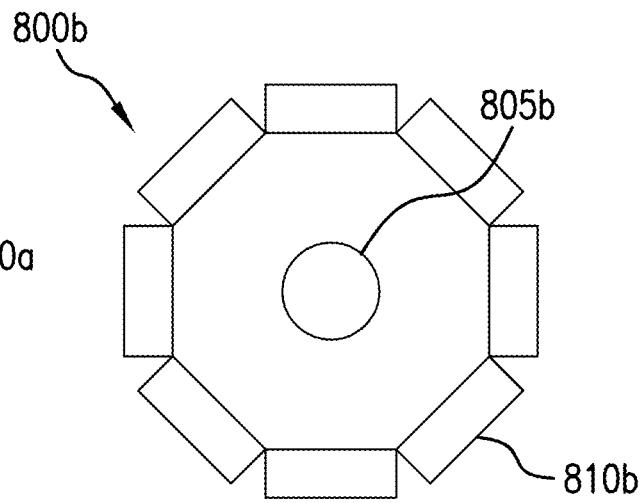
FIG. 8B depicts rectangular monitor photo-detectors in an exemplary circular pattern, surrounding a primary photo-detector.

FIG. 8B depicts rectangular photo-detectors in an exemplary circular pattern, surrounding a primary photo-detector. A photo-detector arrangement 800b includes a primary photo-detector 805b. The primary photo-detector 805b is surrounded by one or more rectangular monitor photo-detectors 810b arranged in a ring. In some examples, with the monitor photo-detectors 810b placed in a ring, an off-axis reflected light beam, may be from beams in an off-axis direction.

Figure 8C:
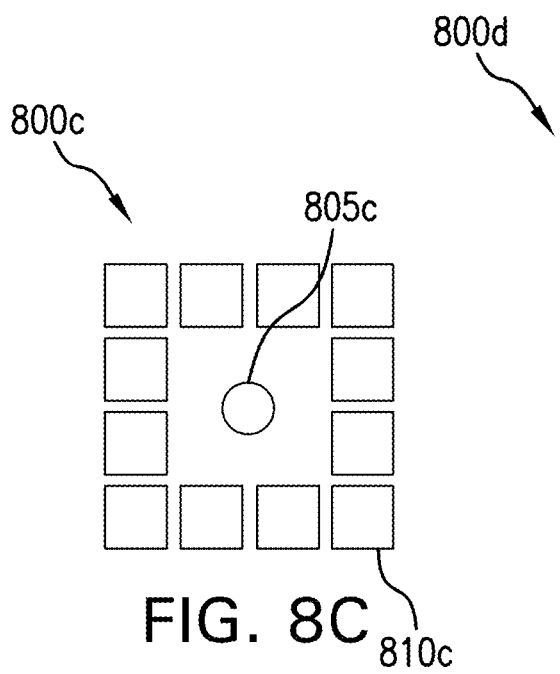
FIG. 8C depicts square monitor photo-detectors in an exemplary square pattern, surrounding a primary photo-detector.

FIG. 8C depicts square photo-detectors in an exemplary square pattern, surrounding a primary photo-detector. A photo-detector arrangement 800c includes a primary photo-detector 805c. The primary photo-detector 805c, is surrounded by one or more square monitor photo-detectors 810c arranged in a larger square. In some examples, with the monitor photo-detectors 810c placed in a larger square, an off-axis reflected light beam, may be detected from beams in an off-axis direction, and the signal processing, executed by a microprocessor, may find benefit in the higher resolution of the smaller monitor photo-detectors 810c.

Figure 8D:
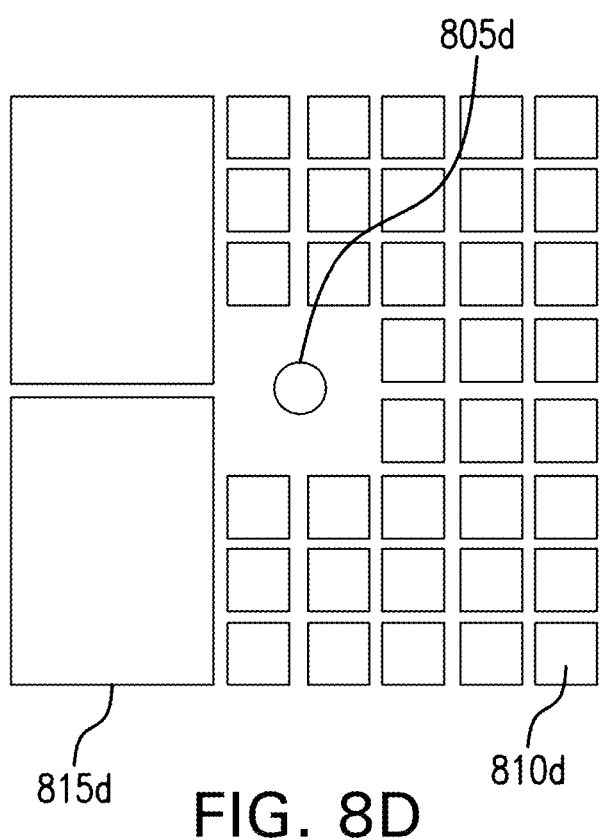
FIG. 8D depicts variably sized monitor photo-detectors, in an exemplary pattern surrounding a primary photo-detector.

FIG. 8D depicts variably sized photo-detectors in an exemplary pattern surrounding a primary photo-detector. A photo-detector arrangement 800d, includes a primary photo-detector 805d. The primary photo-detector 805d is surrounded by one or more small sized monitor photo-detectors 810d and one or more large sized monitor photo-detectors 815d arranged in a larger square. In some examples, with the monitor photo-detectors 810d and 815d placed in a larger square, an off-axis reflected light beam may be detected from beams in an off-axis direction, and the signal processing, executed by the microprocessor, may find benefit, for example, in the higher resolution of the smaller area monitor photo-detectors 810d, and in the higher sensitivity of the larger area monitor photo-detectors 815d. In some implementations, asymmetric layout of monitor photo-detectors may advantageously be oriented, for example, to improve disturbance rejection against reflected light coming from a static angle, such as a white floor, for example.

Figure 8E:
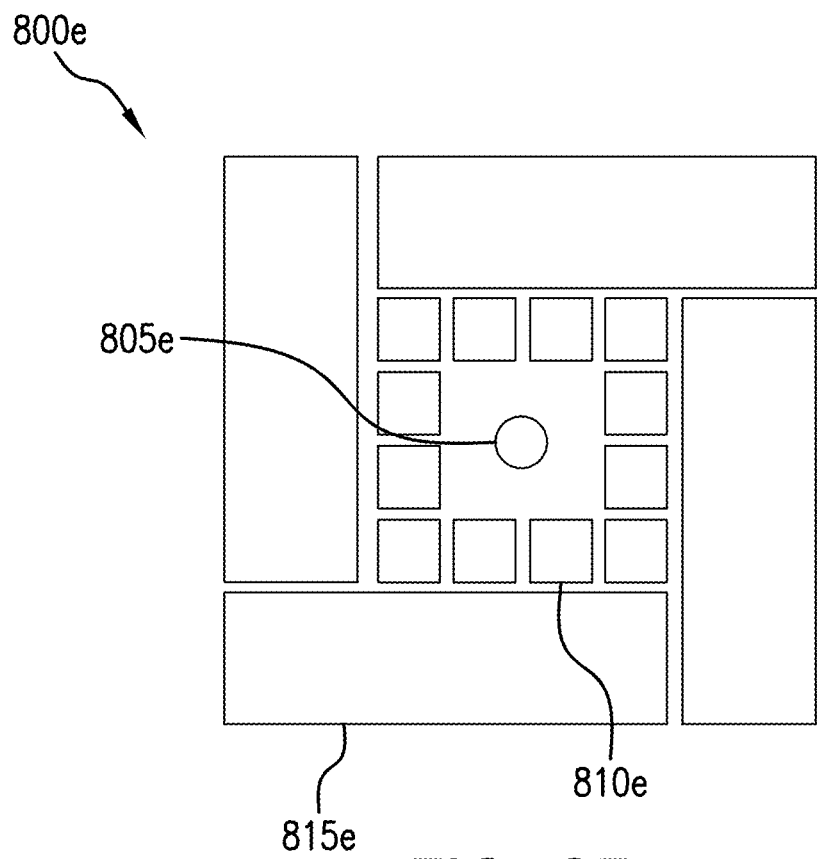
FIG. 8E depicts variably sized monitor photo-detectors in an exemplary symmetrical pattern, surrounding a primary photo-detector.

FIG. 8E depicts variably sized photo-detectors in an exemplary symmetrical pattern, surrounding a primary photo-detector. A photo-detector arrangement 800e includes a primary photo-detector 805e. The primary photo-detector 805e is surrounded by one or more small sized monitor photo-detectors 810e and one or more large sized monitor photo-detectors 815e arranged in a larger square. In some examples, with the monitor photo-detectors 810e and 815e placed in a larger square, an off-axis reflected light beam, may be detected from beams in an off-axis direction, and the signal processing, executed by the microprocessor, may find benefit in the higher resolution of the smaller area monitor photo-detectors 810e, and/or in the higher sensitivity of the larger area monitor photo-detectors 815e. In some examples, an RRPES may find further benefit from the symmetrical pattern of both large and small photo-detectors.

Figure 8F:
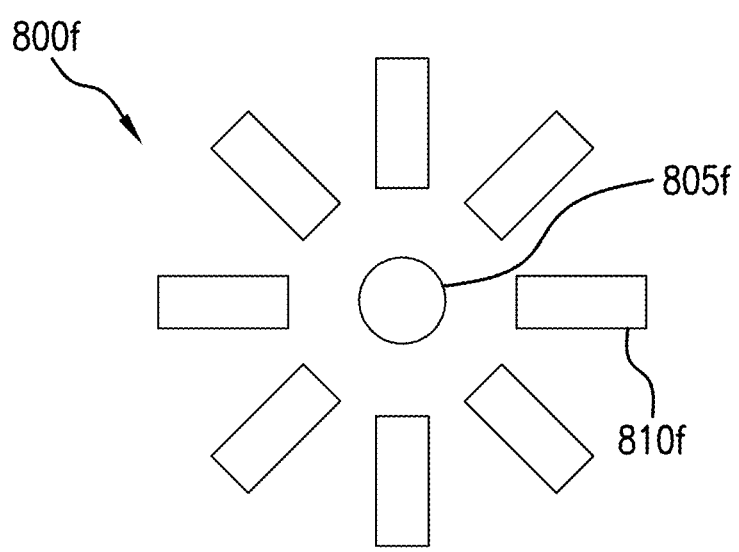
FIG. 8F depicts rectangular monitor photo-detectors in an exemplary radial pattern, surrounding a primary photo-detector.

FIG. 8F depicts rectangular photo-detectors in an exemplary radial pattern, surrounding a primary photo-detector. A photo-detector arrangement 800f includes a primary photo-detector 805f The primary photo-detector 805f is surrounded by one or more rectangular monitor photo-detectors 810f arranged in a radial pattern. In some examples, with the monitor photo-detectors 810f, placed in a radial pattern, an off-axis reflected light beam may be detected from beams in an off-axis direction, and smaller deflections may be more reliably detected.

Figure 8G:
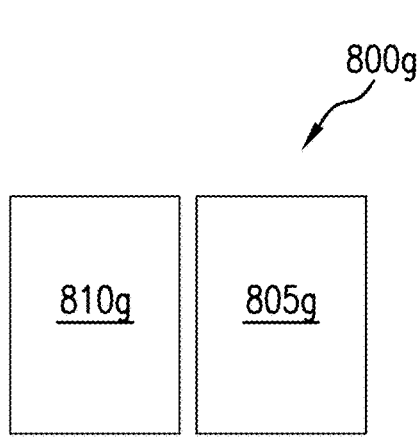
FIG. 8G depicts an exemplary single element pixel monitor photo-detector in a position adjacent a primary photo-detector.

FIG. 8G depicts an exemplary single element pixel monitor photo-detector in a position adjacent a primary photo-detector. A photo-detector arrangement 800g includes a primary photo-detector 805g. The primary, single pixel photo-detector 805g is adjacent to a single pixel monitor photo-detector 810g. In some examples, with the monitor photo-detector 810g in an adjacent placement, an off-axis reflected image may be detected.

Figure 8H:
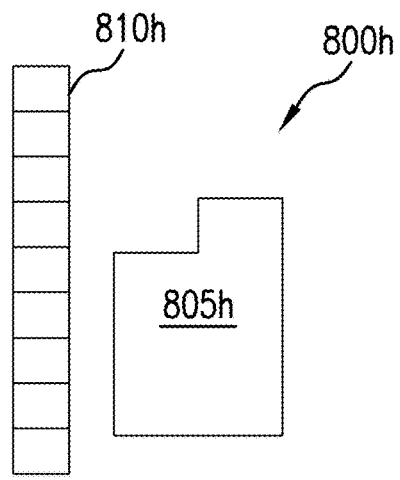
FIG. 8H depicts an exemplary linear array of monitor photo-detectors in a position adjacent a primary photo-detector.

FIG. 8H depicts an exemplary linear array of monitor photo-detectors in a position adjacent a primary photo-detector. A photo-detector arrangement 800h includes a primary photo-detector 805h. The primary, single pixel photo-detector 805h has an irregular shape detection surface. Adjacent and parallel to an edge of the primary photo-detector 805h is a linear array of pixels arranged as a monitor photo-detector 810h. In some examples, with the monitor photo-detector 810h in an adjacent placement, an off-axis reflected image may be detected, wherein a light pattern of the image may be determined according to a distribution of the image across the elements of the linear array 810h.

Figure 8I:
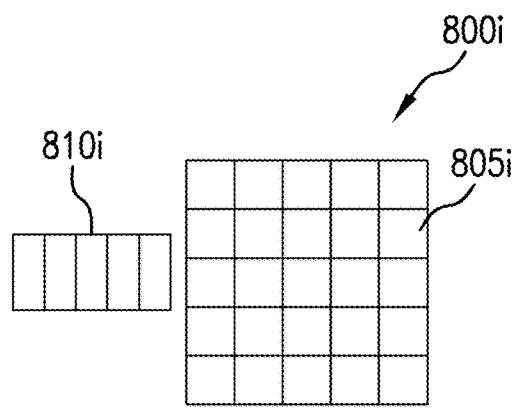
FIG. 8I depicts an exemplary linear array of monitor photo-detectors radially extending from a position adjacent a primary photo-detector.

FIG. 8I depicts an exemplary linear array of monitor photo-detectors radially extending from a position adjacent a primary photo-detector. A photo-detector arrangement 800i includes a primary photo-detector 805i. The primary, multi-pixel photo-detector 805i has a rectangular detection surface. Adjacent and radial to an edge of the primary photo-detector 805i is a linear array of pixels arranged as a monitor photo-detector 810i. In some examples, with the monitor photo-detector 810i in an adjacent placement, an off-axis reflected image may be detected, wherein an off-axis angle of a light pattern of the image may be determined according to a distribution of the image across the elements of the linear array 810i.

Figure 8J:
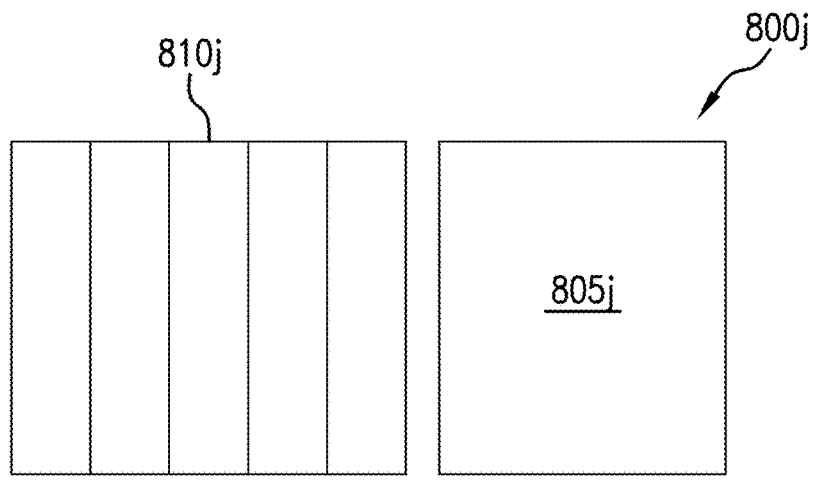
FIG. 8J depicts an exemplary array of linear strips of monitor photo-detectors radially extending from a position adjacent a primary photo-detector.

FIG. 8J depicts an exemplary array of linear strips of monitor photo-detectors radially extending from a position adjacent a primary photo-detector. A photo-detector arrangement 800j includes a primary photo-detector 805j. The primary, single-pixel photo-detector 805j has a rectangular detection surface. Adjacent and radial to an edge of the primary photo-detector 805j is a linear array of parallel strips of detection surfaces arranged as a monitor photo-detector 810j. In some examples, with the monitor photo-detector 810j in an adjacent placement, an off-axis reflected image may be detected, wherein an off-axis angle of a light pattern of the image may be determined according to a distribution of the image across the elements of the linear array 810j.

Although various embodiments have been described with reference to the figures, other embodiments are possible. For example, reflected light may be detected by triangulation, for example, by the addition of a monitor photo-detector which may be located off-axis behind a receiver. In some embodiments, a monitor photo-detector may be employed to optically detect a diffuse-reflective obstruction within the detection beam.

Apparatus and associated methods relate to a retro-reflective photoelectric sensor (RRPES) apparatus, having a photoelectric emitter, lens in front of the emitter, a primary photo-detector element and at least one monitor photo-detector element adjacent to the primary photo-detector element, a remotely-located reflector positioned to reflect light back toward the photoelectric elements, where a portion of the reflected light is detected only by at least one photo-detector element.

In some embodiments, the retro-reflective system may be optimized for outdoor use, such that the system is water and salt-spray resistant. In some embodiments, the retro-reflective system may be designed for indoor use, and may be a cost-reduced version of the outdoor, more robust system. In some examples, the mounting mechanisms for the retro-reflective system may be substantially robust, withstanding foreseeable abuse events, for example, warehouse dolly collisions.

In an illustrative example, a retro-reflective system, may independently detect a white card obstruction via an off-axis monitor photo-detector, which may allow for a lower detection threshold of a retro-reflector target signal. Employment of this detection method may base the system's detection range on its electrical noise floor, rather than on a white card signal ceiling. This independent detection may result in a higher excess gain, or higher detection sensitivity, of a retro-reflective target signal, which may advantageously increase the system's detection range.

The maximum sensing range of a retro-reflective system may be limited by the maximum signal from a diffuse white card that may be inserted into a sensing beam. In an illustrative example, the effective sensing range of a retro-reflective system may have limitations, due to conditions in which a reflective object, such as a white piece of paper, is placed in the field of view between the emitted light beam and the retro-target, the light may reflect off the paper at a substantially significant amplitude, which may be substantially similar to the light which would be reflected from the retro-target itself. A monitor photo-detector to independently collect diffused light, which may be scattered by an obstruction, for example, a white card, may determine the obstruction's diffusion pattern to avoid a false positive (a false "all clear"). This second independent detection may allow a lower minimum threshold of the light sensing system, limited by "system noise," to increase the range of the retro-reflective system.

In some embodiments, the monitor photo-detectors may be implemented on a die on a silicon wafer. In some examples, a microcontroller may be located on the same silicon die.

In some examples, signal processing may be implemented in multi-pixel detection arrays. In such systems, the signal processing may build a pixel map based on the data collected from the detection array.

A beam splitter, in various implementations, may provide a beam split ratio of about 50/50, 60/40, 70/30, 80/20, 90/10, or about 95/5, for example.

In some implementations, some embodiments may be incorporated by modification of existing retro-reflective photoelectric sensors, an example of which is described in further detail with reference to at least FIG. 1 of U.S. Pat. No. 6,946,643, entitled "Retro-reflective Photoelectric Sensor," filed by Fayfield, R. on Jan. 17, 2003, the entire contents of which are incorporated herein by reference for all purposes.

Some aspects of embodiments may be implemented as a computer system. For example, various implementations may include digital and/or analog circuitry, computer hardware, firmware, software, or combinations thereof. Apparatus elements can be implemented in a computer program product tangibly embodied in an information carrier, e.g., in a machine-readable storage device, for execution by a programmable processor; and methods can be performed by a programmable processor executing a program of instructions to perform functions of various embodiments by operating on input data and generating an output. Some embodiments can be implemented advantageously in one or more computer programs that are executable on a programmable system including at least one programmable processor coupled to receive data and instructions from, and to transmit data and instructions to, a data storage system, at least one input device, and/or at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example and not limitation, both general and special purpose microprocessors, which may include a single processor or one of multiple processors of any kind of computer. Generally, a processor will receive instructions and data from a read-only memory or a random-access memory or both. The essential elements of a computer are a processor for executing instructions and one or more memories for storing instructions and data. Storage devices suitable for tangibly embodying computer program instructions and data include all forms of non-volatile memory, including, by way of example, semiconductor memory devices, such as EPROM, EEPROM, and flash memory devices. The processor and the memory can be supplemented by, or incorporated in, ASICs (application-specific integrated circuits). In some embodiments, the processor and the member can be supplemented by, or incorporated in hardware programmable devices, such as FPGAs, for example.

In some implementations, each system may be programmed with the same or similar information and/or initialized with substantially identical information stored in volatile and/or non-volatile memory. For example, one data interface may be configured to perform auto configuration, auto download, and/or auto update functions when coupled to an appropriate host device, such as a desktop computer or a server.

In some implementations, one or more user-interface features may be custom configured to perform specific functions. An exemplary embodiment may be implemented in a computer system that includes a graphical user interface and/or an Internet browser. To provide for interaction with a user, some implementations may be implemented on a computer having a display device, such as an LCD (liquid crystal display) monitor for displaying information to the user, a keyboard, and a pointing device, such as a mouse or a trackball by which the user can provide input to the computer.

In various implementations, the system may communicate using suitable communication methods, equipment, and techniques. For example, the system may communicate with compatible devices (e.g., devices capable of transferring data to and/or from the system) using point-to-point communication in which a message is transported directly from the source to the first receiver over a dedicated physical link (e.g., fiber optic link, point-to-point wiring, daisy-chain). The components of the system may exchange information by any form or medium of analog or digital data communication, including packet-based messages on a communication network. Examples of communication networks include, e.g., a LAN (local area network), a WAN (wide area network), MAN (metropolitan area network), wireless and/or optical networks, and the computers and networks forming the Internet. Other implementations may transport messages by broadcasting to all or substantially all devices that are coupled together by a communication network, for example, by using Omni-directional radio frequency (RF) signals. Still other implementations may transport messages characterized by high directivity, such as RF signals transmitted using directional (i.e., narrow beam) antennas or infrared signals that may optionally be used with focusing optics. Still other implementations are possible using appropriate interfaces and protocols such as, by way of example and not intended to be limiting, USB 2.0, Fire wire, ATA/IDE, RS-232, RS-422, RS-485, 802.11 a/b/g, Wi-Fi, WiFi-Direct, Li-Fi, Bluetooth, Ethernet, IrDA, FDDI (fiber distributed data interface), token-ring networks, or multiplexing techniques based on frequency, time, or code division. Some implementations may optionally incorporate features such as error checking and correction (ECC) for data integrity, or security measures, such as encryption (e.g., WEP) and password protection.

A number of implementations have been described. Nevertheless, it will be understood that various modification may be made. For example, advantageous results may be achieved if the steps of the disclosed techniques were performed in a different sequence, or if components of the disclosed systems were combined in a different manner, or if the components were supplemented with other components. Accordingly, other implementations are contemplated within the scope of the following claims.

What is claimed is:

1. A photoelectric sensor system to detect objects in a protected field between a light source and a retro-reflecting target, the system comprising:
 a retro-reflective substrate operable to redirect a portion of light from an incident optical path to a reflected optical path that is substantially parallel with the incident path; and,
 an optical transceiver comprising:
  an emitter configured to generate an optical signal directed along the incident optical path;
  a first photo-detector element having a first detection surface configured to receive at least a portion of the generated optical signal incident along the reflected optical path and to detect a first pattern of light incident at the first detection surface;
  a second photo-detector element having a second detection surface disposed proximate the first detection surface, the second photo-detector element configured to receive a second optical signal and to detect a second light pattern of light incident at the second detection surface; and,
  a controller operably coupled to the first photo-detector element and to the second photo-detector element, and configured to generate a notification signal in response to determining that the incident optical path is obstructed between the emitter and the retro-reflective substrate based on the detected first and second light patterns, wherein the notification signal is further determined by:
   receiving a first signal count representative of an amount of light incident on the first detection surface;
   receiving a second signal count representative of an amount of light incident on the second detection surface;
   determining an excess gain ratio by dividing the first signal count by a detector threshold level, and,
   generating the notification signal based on the determined excess gain ratio, wherein the detector threshold level is determined based on the received second signal count.

2. The system of claim 1, wherein the emitter further comprises a light source and a beam splitter to direct the generated optical signal through a lens and along the incident optical path.

3. The system of claim 2, wherein the reflected optical path extends through the lens and is redirected by the beam splitter onto the first detection surface.

4. The system of claim 1, wherein the generated optical signal is directed along the incident optical path through a first lens having a first optical axis, and the portion of the generated optical signal received along the reflected optical path passes through a second lens having a second optical axis, wherein the first optical axis is substantially parallel to the second optical axis.

5. The system of claim 4, wherein the emitter is substantially aligned with the first optical axis, and the first photo-detector element is substantially aligned with the second optical axis, and the second detection surface is proximately adjacent to the first detection surface to receive optical signals that are incident on the second lens and not substantially parallel to the second optical axis.

6. The system of claim 1, wherein the second detection surface comprises a plurality of detection areas disposed proximately adjacent to the first detection surface.

7. The system of claim 6, wherein the plurality of detection areas are asymmetrically arranged about the first detection surface.

8. The system of claim 1, wherein the determination that the incident optical path is obstructed is further based on a difference between a first number of pixels associated with the first detected light pattern and a second number of pixels associated with the second detected light pattern.

9. The system of claim 1, wherein the first photo-detector element and the second photo-detector element have substantially co-planar detection surfaces.

10. The system of claim 1, wherein the first photo-detector element and the second photo-detector element each comprise a plurality of photo-detectors arranged as an array of pixels on a semiconductor substrate.

11. The system of claim 1, wherein the first photo-detector element and the second photo-detector element are formed on the same semiconductor substrate.

12. The system of claim 1, further comprising a housing configured to contain the emitter, the first photo-detector element, the second photo-detector element, and the controller, and to support the first photo-detector element and the second photo-detector element in optical alignment with the retro-reflective substrate.

13. A photoelectric sensor system to detect objects in a protected field between a light source and a retro-reflecting target, the system comprising:
   an emitter configured to generate an optical signal directed along an incident optical path from the emitter to a retro-reflective substrate operable to redirect a portion of light from an incident optical path to a reflected optical path that is substantially parallel with from the incident path;
   a first photo-detector element having a first detection surface configured to receive at least a portion of the generated optical signal incident along the reflected optical path and to detect a first pattern of light incident at the first detection surface;
   a second photo-detector element having a second detection surface disposed proximate the first detection surface, the second photo-detector element configured to receive a second optical signal and to detect a second pattern of light incident at the second detection surface; and,
   a controller operably coupled to the first photo-detector element and to the second photo-detector element, and configured to generate a notification signal in response to determining that the incident optical path is obstructed between the emitter and the retro-reflective substrate based on the detected first and second light patterns, wherein the notification signal is further determined by:
   receiving a first signal count representative of an amount of light incident on the first detection surface;
   receiving a second signal count representative of an amount of light incident on the second detection surface;
   determining an excess gain ratio by dividing the first signal count by a detector threshold level; and,
   generating the notification signal based on the determined excess gain ratio, wherein the detector threshold level is determined based on the received second signal count.

14. The system of claim 13, further comprising a polarizing filter through which pass the light incident on the first detection surface and the light incident on the second detection surface.

15. The system of claim 13, wherein the emitter further comprises a light source and a beam splitter to direct the generated optical signal through a lens and along the incident optical path.

16. The system of claim 15, wherein the reflected optical path extends through the lens and is redirected by the beam splitter onto the first detection surface.

17. The system of claim 13, wherein the generated optical signal is directed along the incident optical path through a first lens having a first optical axis, and the portion of the generated optical signal received along the reflected optical path passes through a second lens having a second optical axis, wherein the first optical axis is substantially parallel from the second optical axis.

18. The system of claim 17, wherein the emitter is substantially aligned with the first optical axis, and the first photo-detector element is substantially aligned with the second optical axis, and the second detection surface is proximately adjacent to the first detection surface to receive optical signals that are incident on the second lens and not substantially parallel to the second optical axis.

19. A photoelectric sensor system configured to detect objects in a protected field between a light source and a retro-reflecting target, the photoelectric sensor system comprising:
   an emitter configured to generate an optical signal directed along an incident optical path from the emitter to a retro-reflective substrate operable to redirect a portion of light from an incident optical path to a reflected optical path that is substantially parallel with the incident path;
   a first photo-detector element having a first detection surface configured to receive at least a portion of the generated optical signal incident along the reflected optical path and to detect a first pattern of light incident at the first detection surface;
   a second photo-detector element having a second detection surface disposed proximate the first detection surface, the second photo-detector element configured to receive a second optical signal and to detect a second pattern of light incident at the second detection surface; and,
   a processor operably coupled to the first photo-detector element and to the second photo-detector element; and,
   a data store operably coupled to the processor and containing instructions that, when executed on the processor, cause operations to generate an object detection signal, the operations comprising:

receive a first signal count representative of an amount of light incident on the first detection surface, and a second signal count representative of an amount of light incident on the second detection surface;

determine an excess gain ratio by dividing the first signal count by a detector threshold level; and, generate the notification signal based on the determined excess gain ratio, wherein the detector threshold level is determined based on the received second signal count.

20. The system of claim 19, wherein the detector threshold level is determined as a peak of a plurality of received second signal counts.

* * * * *